US010791896B2

(12) United States Patent
Conrad

(10) Patent No.: US 10,791,896 B2
(45) Date of Patent: Oct. 6, 2020

(54) SURFACE CLEANING APPARATUS

(71) Applicant: Omachron Intellectual Property inc., Hampton (CA)

(72) Inventor: Wayne Ernest Conrad, Hampton (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 259 days.

(21) Appl. No.: 16/039,875

(22) Filed: Jul. 19, 2018

(65) Prior Publication Data

US 2020/0022546 A1 Jan. 23, 2020

(51) Int. Cl.

| | |
|---|---|
| ***B01D 50/00*** | (2006.01) |
| ***A47L 9/16*** | (2006.01) |
| ***A47L 5/16*** | (2006.01) |
| ***A47L 9/06*** | (2006.01) |
| *A47L 9/28* | (2006.01) |

(Continued)

(52) U.S. Cl.

CPC ............... *A47L 9/1616* (2013.01); *A47L 5/16* (2013.01); *A47L 9/0606* (2013.01); *A47L 9/1683* (2013.01); *A47L 5/24* (2013.01); *A47L 9/122* (2013.01); *A47L 9/165* (2013.01); *A47L 9/1608* (2013.01); *A47L 9/1625* (2013.01); *A47L 9/1666* (2013.01); *A47L 9/1691* (2013.01);

(Continued)

(58) Field of Classification Search

CPC ........ A47L 9/1616; A47L 5/16; A47L 9/0606; A47L 9/1683; A47L 9/165; A47L 9/1691; A47L 9/246; A47L 9/2857; A47L 9/1666; A47L 9/1608; A47L 9/122; A47L 5/24; A47L 9/1625; Y10S 55/03; B04C 5/04

See application file for complete search history.

(56) References Cited

U.S. PATENT DOCUMENTS

| | | | | |
|---|---|---|---|---|
| 7,065,826 B1 | 6/2006 | Arnold | | |
| 7,470,299 B2 * | 12/2008 | Han | ...................... | A47L 9/1625 15/350 |

(Continued)

FOREIGN PATENT DOCUMENTS

| | | |
|---|---|---|
| CN | 102429611 A | 5/2012 |
| CN | 106725109 A | 5/2017 |

(Continued)

OTHER PUBLICATIONS

English machine translation of EP2866630B1, published on Aug. 31, 2016.

(Continued)

*Primary Examiner* — Dung H Bui

(74) *Attorney, Agent, or Firm* — Philip C. Mendes da Costa; Bereskin & Parr LLP/S.E.N.C.R.L., s.r.l.

(57) ABSTRACT

A surface cleaning apparatus has a first air flow path extending from a dirty air inlet to a clean air outlet with a suction motor and a cyclone positioned in the first air flow path. The cyclone has a cyclone chamber, a first airflow passage, and a second airflow passage. The first airflow passage and second airflow passage are isolated from each other. The first airflow passage defines a first tangential air inlet to the cyclone chamber and the second airflow passage defines a second tangential air inlet to the cyclone chamber. The second tangential air inlet is positioned around the perimeter of the cyclone chamber sidewall downstream from the first tangential air inlet in the direction of rotation of air in the cyclone chamber.

20 Claims, 15 Drawing Sheets

(51) Int. Cl.

| | |
|---|---|
| *A47L 9/24* | (2006.01) |
| *A47L 5/24* | (2006.01) |
| *A47L 9/12* | (2006.01) |
| *B04C 5/04* | (2006.01) |

(52) U.S. Cl.

CPC ............. *A47L 9/246* (2013.01); *A47L 9/2857* (2013.01); *B04C 5/04* (2013.01); *Y10S 55/03* (2013.01)

(56) References Cited

U.S. PATENT DOCUMENTS

| | | | | |
|---|---|---|---|---|
| 7,534,279 | B2 * | 5/2009 | Oh | A47L 9/1625 55/343 |
| 7,628,833 | B2 * | 12/2009 | Oh | A47L 9/1625 15/353 |
| 7,655,058 | B2 * | 2/2010 | Smith | A47L 9/165 15/353 |
| 7,662,201 | B2 | 2/2010 | Lee | |
| 7,686,861 | B2 * | 3/2010 | Oh | A47L 9/1608 15/352 |
| 7,771,499 | B2 | 8/2010 | Oh et al. | |
| 7,867,308 | B2 | 1/2011 | Conrad | |
| 8,048,180 | B2 * | 11/2011 | Oh | A47L 9/1641 15/347 |
| 8,186,006 | B2 * | 5/2012 | Hyun | A47L 9/1625 15/347 |
| 2005/0229554 | A1 * | 10/2005 | Oh | B04C 5/04 55/346 |
| 2008/0104795 | A1 | 5/2008 | Lang | |
| 2009/0241491 | A1 | 10/2009 | Han et al. | |
| 2009/0293224 | A1 * | 12/2009 | Hyun | A47L 9/1666 15/353 |
| 2018/0177363 | A1 | 6/2018 | Ni | |

FOREIGN PATENT DOCUMENTS

| | | | | |
|---|---|---|---|---|
| EP | 2866630 | B1 | 8/2016 | |
| JP | 08-322769 | A | 12/1996 | |
| JP | 2003112082 | A * | 4/2003 | A47L 9/1683 |
| KR | 100816911 | B1 | 3/2008 | |
| KR | 100880494 | B1 | 1/2009 | |
| KR | 10-1692736 | B1 | 1/2017 | |
| WO | 9835603 | A1 | 8/1998 | |
| WO | 2008114966 | A1 | 9/2008 | |
| WO | 2009011494 | A1 | 1/2009 | |
| WO | 2017171500 | A1 | 10/2017 | |
| WO | 2017185175 | A1 | 11/2017 | |

OTHER PUBLICATIONS

English machine translation of CN102429611A, published on May 2, 2012.

English machine translation of CN106725109A, published on May 31, 2017.

English machine translation of KR100880494B1, published on Jan. 19, 2009.

English machine translation of CN102429611, published on May 2, 2012.

English machine translation of KR10081691161, published on Mar. 19, 2008.

International Search Report and Written Opinion, received in connection to co-pending international patent application No. PCT/CA2019/050984, dated Oct. 10, 2019.

Total Patent: English machine translation of KR10-1692736, published on Jan. 4, 2017.

English machine translation of JP08-322769, published on Dec. 10, 2016, obtained through JP Patent Office search engine.

* cited by examiner

SURFACE CLEANING APPARATUS

FIELD

This disclosure relates generally to surface cleaning apparatus such as hand vacuum cleaners, upright vacuum cleansers, stick vacuum cleaners or canister vacuum cleaners, and in particular surface cleaning apparatus with multi-inlet cyclone chambers.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic surface cleaning apparatus are known in the art, including cyclonic hand vacuum cleaners.

Cyclones may have an axial inlet or a tangential inlet. Further a cyclone may have multiple inlets which are fed by a single chamber. See for example US2018/0177363.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In surface cleaning apparatuses, reduced size can provide improved maneuverability and ease of use, particularly for hand vacuum cleaners. However, surface cleaning apparatuses are constrained by the number of components necessary to provide the cleaning operation, such as a suction motor, a cyclone chamber, and a dirt collection area. Reducing the size required for these components without negatively impacting the operability of a surface cleaning apparatus is thus highly desirable.

In accordance with one aspect of this disclosure, which may be used alone or in combination with any other aspect, a surface cleaning apparatus is provided with a cyclone chamber that operates as an air treatment member. Dirty air enters the cyclone chamber, and dirt and debris is separated from the air as it flows through the cyclone chamber.

When dirty air is introduced into a cyclone chamber, the air travels in a swirling pattern from the inlet end of the cyclone to the opposite end. Air enters the cyclone chamber as a band that substantially maintains its form as it swirls around the cyclone chamber. To ensure that dirt and debris is sufficiently separated from the swirling air, each band of air entering the cyclone chamber should complete a minimum number of revolutions around the cyclone chamber, e.g. 3 or 4 revolutions. As a result, the height of the cyclone chamber is dictated by the number of revolutions required and the height of the air bands entering the cyclone chamber.

The height of air bands entering the cyclone chamber is dictated by the height of the inlets to the cyclone chamber. The taller the cyclone inlets, the taller the cyclone chamber must be to provide the desired number of revolutions. For example, if a cyclone air inlet were 1 inch tall, the cyclone chamber would have to be 4-4.5 inches to allow 4 complete rotations of the air band entering the cyclone chamber. If the inlet were 2 inches tall, the cyclone chamber would have to be 8-9 inches tall to allow 4 complete revolutions.

The height of the cyclone inlet is also dictated by the volume of air drawn into the surface cleaning apparatus. To reduce backpressure, the cyclone inlet should be large enough to accommodate the volume of air drawn into the surface cleaning apparatus. Thus, the cross-sectional area of the cyclone inlet must be increased if a greater volume of air is to be drawn into the surface cleaning apparatus. This often requires taller cyclone inlets, resulting in a corresponding increase in the height of the cyclone chamber.

In accordance with one aspect of this disclosure, which may be used alone or in combination with any other aspect, a surface cleaning apparatus may be provided with multiple airflow passages leading to the cyclone chamber. Each airflow passage may terminate at one or more ports into the cyclone chamber. Therefore, if an airflow passage terminates at a single port in the sidewall of a cyclone chamber, then each airflow passage may provide a separate air inlet to the cyclone chamber. Each cyclone inlet can be a substantially tangential air inlet into the cyclone chamber. By providing multiple separate airflow passages through which the dirty air can enter the cyclone chamber, the height of the cyclone inlets may be reduced without reducing the volume of air that can be drawn into the surface cleaning apparatus and the separation efficiency of the cyclone may be improved.

In accordance with this broad aspect, there is provided a surface cleaning apparatus comprising:

(a) an air flow path extending from a dirty air inlet to a clean air outlet with a suction motor positioned in the air flow path; and, (b) a cyclone positioned in the air flow path, the cyclone having a cyclone chamber, a cyclone chamber sidewall, a first airflow passage having an inlet end and a downstream outlet end wherein the downstream outlet end comprises a first tangential air inlet, a second airflow passage having an inlet end and a downstream outlet end wherein the downstream outlet end comprises a second tangential air inlet, a cyclone air outlet and a longitudinal cyclone axis about which the air rotates in the cyclone chamber in a direction of rotation of air in the cyclone chamber, wherein the first tangential air inlet has an upstream edge that is upstream from a downstream edge of the first tangential air inlet in the direction of rotation of air in the cyclone chamber and the second tangential air inlet has an upstream edge that is upstream from a downstream edge of the second tangential air inlet in the direction of rotation of air in the cyclone chamber, and wherein the first and second airflow passages are isolated from each other, and wherein the second tangential air inlet is positioned around a perimeter of the cyclone chamber sidewall downstream from the first tangential air inlet in the direction of rotation of air in the cyclone chamber.

In any embodiment, a plane transverse to the cyclone axis may extend through the first and second tangential air inlets.

In any embodiment, a portion of each of the first and second airflow passages may extend generally parallel to the cyclone axis and the portions can be adjacent each other.

In any embodiment, a portion of each of the first and second airflow passages may extend generally parallel to the cyclone axis and the portions may abut each other.

In any embodiment, the first and second airflow passages may be positioned exterior to the cyclone chamber sidewall.

In any embodiment, the inlet end of the first airflow passage and the inlet end of the second airflow passage may each be in fluid communication with a single upstream air flow conduit.

In any embodiment, the surface cleaning apparatus may be a hand vacuum cleaner and each of the first and second airflow passages may extend from the dirty air inlet.

In any embodiment, the surface cleaning apparatus may be a hand vacuum cleaner and each of the first and second airflow passages may extend from an inlet end of the dirty air inlet.

In any embodiment, the upstream edge of the second tangential air inlet may be adjacent the downstream edge of the first tangential air inlet.

In any embodiment, a portion of the cyclone chamber sidewall may be positioned between the upstream edge of the second tangential air inlet and the downstream edge of the first tangential air inlet.

In any embodiment, a downstream portion of the second airflow passage may be spaced apart from a downstream portion of the first airflow passage.

In any embodiment, the downstream portion of the second airflow passage may be generally linear.

In any embodiment, a downstream portion of the first airflow passage may be generally linear.

In accordance with another aspect of this disclosure, which may be used alone or in combination with any other aspect, it may be desirable for the cyclone chamber to have multiple airflow passages leading to multiple inlet ports in the sidewall of a cyclone chamber while providing a common airflow passage for the dirty air entering the surface cleaning apparatus. This may simplify the design of the inlet conduit, and ensure that the entire volume of the inlet conduit is available to draw in dirty air.

In accordance with this broad aspect, there is provided a surface cleaning apparatus comprising:

(a) an air flow path extending from a dirty air inlet to a clean air outlet with a suction motor positioned in the air flow path; and, (b) a cyclone positioned in the air flow path, the cyclone having a cyclone chamber, a cyclone chamber sidewall, a first airflow passage having an inlet end and a downstream outlet end wherein the downstream outlet end comprises a first tangential air inlet, a second airflow passage having an inlet end and a downstream outlet end wherein the downstream outlet end comprises a second tangential air inlet, a cyclone air outlet and a longitudinal cyclone axis about which the air rotates in the cyclone chamber in a direction of rotation of air in the cyclone chamber, wherein the air flow path comprises a common airflow passage upstream of the first and second airflow passages and an axis of the common airflow passage intersects the cyclone chamber, wherein the second tangential air inlet is positioned around a perimeter of the cyclone chamber sidewall downstream from the first tangential air inlet in the direction of rotation of air in the cyclone chamber, and wherein at least a portion of the first tangential air inlet is positioned upstream from a location at which the common airflow passage axis intersects the cyclone chamber.

In any embodiment, the surface cleaning apparatus may include a divider located adjacent the cyclone at a downstream end of the common airflow passage.

In any embodiment, the divider may include a convex member that extends towards the downstream end of the common airflow passage.

In any embodiment, the surface cleaning apparatus may include a convex member that extends towards the downstream end of the common airflow passage.

In any embodiment, the convex member may have a first portion that comprises a wall at an inlet end to the first airflow passage and a second portion that comprises a wall at an inlet end to the second airflow passage.

In any embodiment, the divider may have a first portion that comprises a wall at an inlet end to the first airflow passage and a second portion that comprises a wall at an inlet end to the second airflow passage.

In any embodiment, the second airflow passage may extend generally linearly from the convex member to the second tangential air inlet and at least a portion of the first airflow passage may extend in a counter rotational direction from the convex member to the first tangential air inlet.

In any embodiment, the second airflow passage may extend generally linearly from the divider to the second tangential air inlet and at least a portion of the first airflow passage may extend in a counter rotational direction from the divider to the first tangential air inlet.

In any embodiment, at least a portion of the first airflow passage may extend in a counter rotational direction.

In any embodiment, the common airflow passage may extend downstream from the dirty air inlet.

In any embodiment, the common airflow passage may extend generally linearly to the first and second airflow passages.

In accordance with this broad aspect, there is also provided a surface cleaning apparatus comprising:

(a) an air flow path extending from a dirty air inlet to a clean air outlet with a suction motor positioned in the air flow path; and, (b) a cyclone positioned in the air flow path, the cyclone having a cyclone chamber, a cyclone chamber sidewall, a first airflow passage having an inlet end and a downstream outlet end wherein the downstream outlet end comprises a first tangential air inlet, a second airflow passage having an inlet end and a downstream outlet end wherein the downstream outlet end comprises a second tangential air inlet, a cyclone air outlet and a longitudinal cyclone axis about which the air rotates in the cyclone chamber in a direction of rotation of air in the cyclone chamber, wherein the air flow path comprises a common airflow passage upstream of the first and second airflow passage, wherein the second tangential air inlet is positioned around a perimeter of the cyclone chamber sidewall downstream from the first tangential air inlet in the direction of rotation of air in the cyclone chamber, and wherein at least a portion of the first airflow passage extends in a counter rotational direction.

It will be appreciated that this latter surface cleaning apparatus may use any one or more of the features previously set out.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
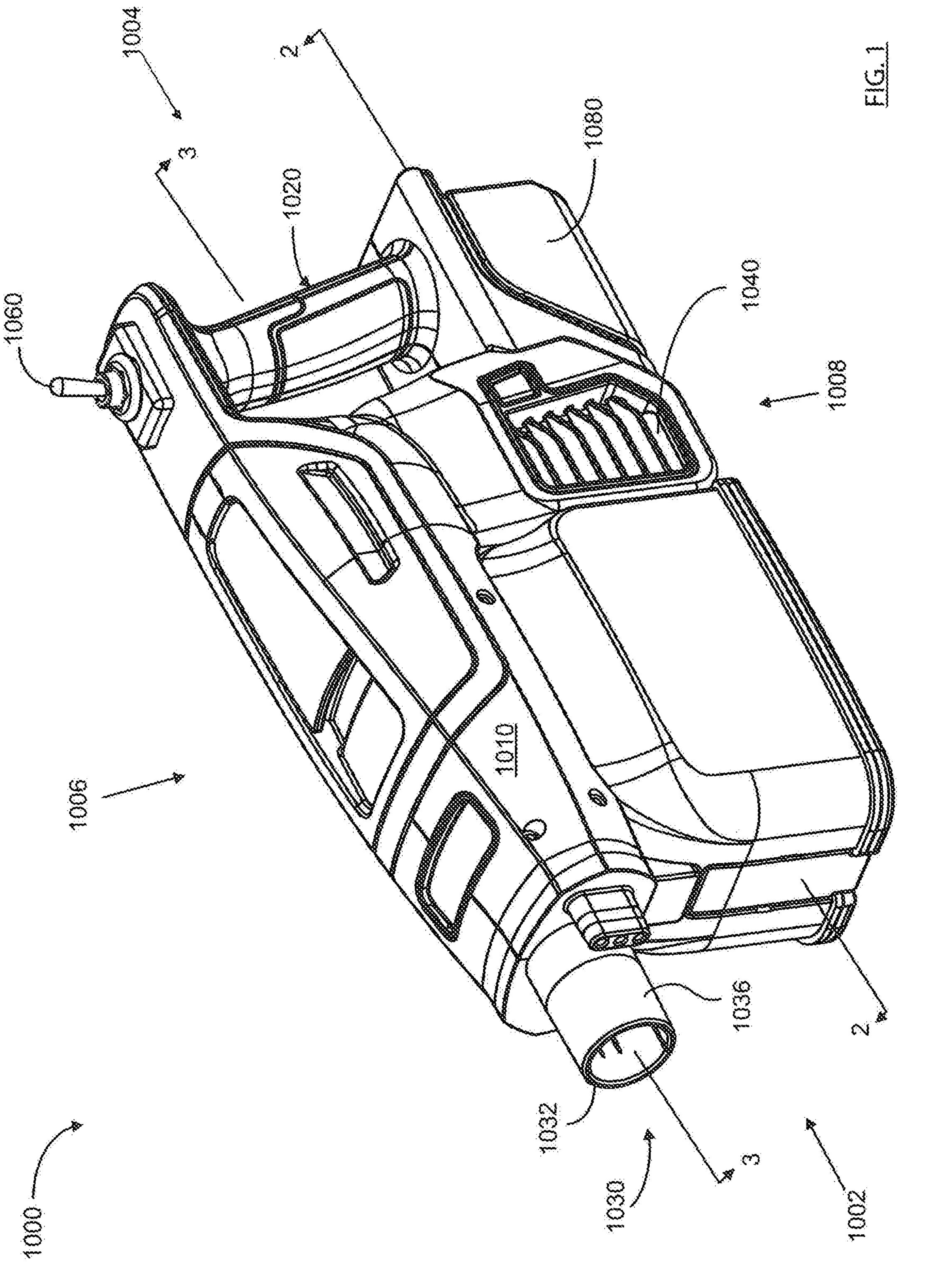
FIG. 1 is a top front perspective view of a hand vacuum cleaner in accordance with an embodiment.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms “a,” “an” and “the” mean “one or more,” unless expressly specified otherwise.

As used herein and in the claims, two or more parts are said to be “coupled”, “connected”, “attached”, or “fastened” where the parts are joined or operate together either directly or indirectly (i.e., through one or more intermediate parts), so long as a link occurs. As used herein and in the claims, two or more parts are said to be “directly coupled”, “directly connected”, “directly attached”, or “directly fastened” where the parts are connected in physical contact with each other. None of the terms “coupled”, “connected”, “attached”, and “fastened” distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

Referring to FIGS. 1 to 4, an exemplary embodiment of a surface cleaning apparatus is shown generally as 1000. In the illustrated embodiment, the surface cleaning apparatus is a hand vacuum cleaner, which may also be referred to also as a “handvac” or “hand-held vacuum cleaner”. As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, the handle and a clean air inlet may be rigidly coupled to each other (directly or indirectly) so as to move as one while maintaining a constant orientation relative to each other. This is to be contrasted with canister and upright vacuum cleaners, whose weight is typically supported by a surface (e.g. a floor) during use. It will be appreciated that surface cleaning apparatus 1000 may alternately be any surface cleaning apparatus, such as an upright surface cleaning apparatus, a stick vac, a canister surface cleaning apparatus, an extractor or the like. It will also be appreciated that the surface cleaning apparatus may use any configuration of the operating components and the airflow paths exemplified herein.

As exemplified in FIGS. 1 to 4, surface cleaning apparatus 1000 includes a main body 1010 having a housing 1011 and a handle 1020, an air treatment member 1100 connected to the main body 1010, a dirty air inlet 1030, a clean air outlet 1040, and an air flow path extending between the dirty air inlet 1030 and the clean air outlet 1040.

Surface cleaning apparatus 1000 has a front end 1002, a rear end 1004, an upper end or top 1006, and a lower end or bottom 1008. In the embodiment shown, dirty air inlet 1030 is at an upper portion of the front end 1002 and clean air outlet 1040 is at rearward portion of the lower end 1008. It will be appreciated that the dirty air inlet 1030 and the clean air outlet 1040 may be provided in different locations.

A suction motor 1050 (see e.g. FIG. 2) is provided to generate vacuum suction through the air flow path, and is positioned within a motor housing. In the illustrated embodiment, the suction motor 1050 is positioned downstream from the air treatment member 1100, although it may be positioned at any location in the surface cleaning apparatus such as upstream of the air treatment member (e.g., a dirty air motor) in alternative embodiments.

Air treatment member 1100 is configured to remove particles of dirt and other debris from the air flow and/or otherwise treat the air flow. In the illustrated example, air treatment member 1100 includes a cyclone assembly having a single cyclonic cleaning stage with a single cyclone chamber 1102 and a dirt collection region 1122 external to the cyclone chamber. The dirt collection chamber 1122 is positioned exterior to the cyclone chamber 1102 and is in communication with the dirt outlet 1120 to receive dirt and debris dis-entrained from a dirty air flow by the cyclone chamber 1110. The cyclone chamber 1102 and dirt collection region 1122 may be of any configuration suitable for separating dirt from an air stream and collecting the separated dirt, respectively.

In alternative embodiments, the cyclone assembly may include two or more cyclonic cleaning stages arranged in series with each other.

Each cyclonic cleaning stage may include one or more cyclone chambers (arranged in parallel or series with each other) and one or more dirt collection chambers, of any suitable configuration. The dirt collection chamber or chambers may be external to the cyclone chambers, or may be internal the cyclone chamber and configured as a dirt collection area or region within the cyclone chamber. Alternatively, the surface cleaning apparatus may also incorporate additional air treatment members, such as a bag, a porous physical filter media (such as foam or felt), or other air treating means.

The surface cleaning apparatus 1000 may include a pre-motor filter housing provided in the airflow path downstream of the air treatment member 1100 and upstream of the suction motor 1050. The pre-motor filter housing may be of any suitable construction, including any of those exemplified herein. A pre-motor filter 1320 is positioned within the pre-motor filter housing. Pre-motor filter 1320 may be formed from any suitable physical, porous filter media and have any suitable shape, including the examples disclosed herein with respect to a removable pre-motor filter assembly. For example, the pre-motor filter may be one or more of a foam filter, felt filter, HEPA filter, other physical filter media, electrostatic filter, and the like.

Optionally, hand vacuum cleaner 1000 may also include a post-motor filter provided in the air flow path downstream of the suction motor 1050 and upstream of the clean air outlet 1040. Post-motor filter may be formed from any suitable physical, porous filter media and have any suitable shape, including the examples disclosed herein. In alternative embodiments, the post-motor filter may be any suitable type of filter such as one or more of a foam filter, felt filter, HEPA filter, other physical filter media, electrostatic filter, and the like.

In the illustrated embodiment, the dirty air inlet 1030 of the hand vacuum cleaner 1000 is the inlet end 1032 of an inlet conduit 1036. Optionally, inlet end 1032 of the conduit 1036 can be used as a nozzle to directly clean a surface. The air inlet conduit 1036 is, in this example, a generally linear hollow member that extends along an inlet conduit axis 1035 that is oriented in a longitudinal forward/backward direction and is generally horizontal when hand vacuum cleaner 1000 is oriented with the upper end 1006 above the lower end 1008. Alternatively, or in addition to functioning as a nozzle, inlet conduit 1036 may be connected or directly connected to the downstream end of any suitable accessory tool such as a rigid air flow conduit (e.g., an above floor cleaning wand), a crevice tool, a mini brush, and the like. As shown, dirty air inlet 1030 is positioned forward of the air treatment member 1100, although this need not be the case. As exemplified, the dirty air inlet 1030 is positioned so that the inlet conduit axis 1035 intersects the cyclone chamber 1102. Optionally, the dirty air inlet 1030 may be provided at an alternate location, such as above the cyclone chamber 1102.

The hand vacuum cleaner also includes a clean air outlet 1040 at the outlet end of the airflow path. The clean air outlet may be located at any position on the surface cleaning apparatus 1000. As exemplified, air may exit the hand vacuum cleaner 1000 via a grill located in a lower portion of the main body 1010 (e.g., via an air outlet provided in the rear end of the main body 1010 or a sidewall adjacent the rear end as shown in FIG. 1). Alternately, air may exit through an upper portion of the main body 1010 or the rear end of the main body 1010.

An optional accessory power coupler 1061 may be provided, e.g., adjacent to the inlet conduit 1036. Accessory power coupler 1061 includes a set of electrical connectors that can inter-engage with compatible electrical connectors on an accessory tool in order to provide an electrical connection between e.g. a power source of the hand vacuum and a motor or other electrical device of an accessory tool (e.g. a powered brush roller, a light source, and the like). While the illustrated accessory power coupler 1061 is a male connector (i.e. projecting outwardly from the main body 1010 of the hand vacuum cleaner 1000), in alternative embodiments it may be a female connector (i.e. recessed inwardly) or any other shape suitable for cooperatively engaging with corresponding connectors on an accessory tool or other attachment. As exemplified, the accessory power coupler 1061 may be positioned laterally to one side of the inlet conduit 1036. In other examples, the accessory power coupler 1061 may be located above or below the inlet conduit 1036.

As exemplified, power may be supplied to the suction motor 1050 and other electrical components of the hand vacuum cleaner from an onboard energy storage member which may include, for example, one or more batteries or other energy storage device. In the illustrated embodiment, the hand vacuum cleaner 1000 includes a removable battery pack 1080 provided below the handle 1020. The battery pack 1080 can include one or more energy storage members, such as batteries. In alternative embodiments, a battery pack may not be provided and power may be supplied to the hand vacuum cleaner by an electrical cord connected to the hand vacuum cleaner (not shown) that can be connected to a standard wall electrical outlet.

Figure 2:
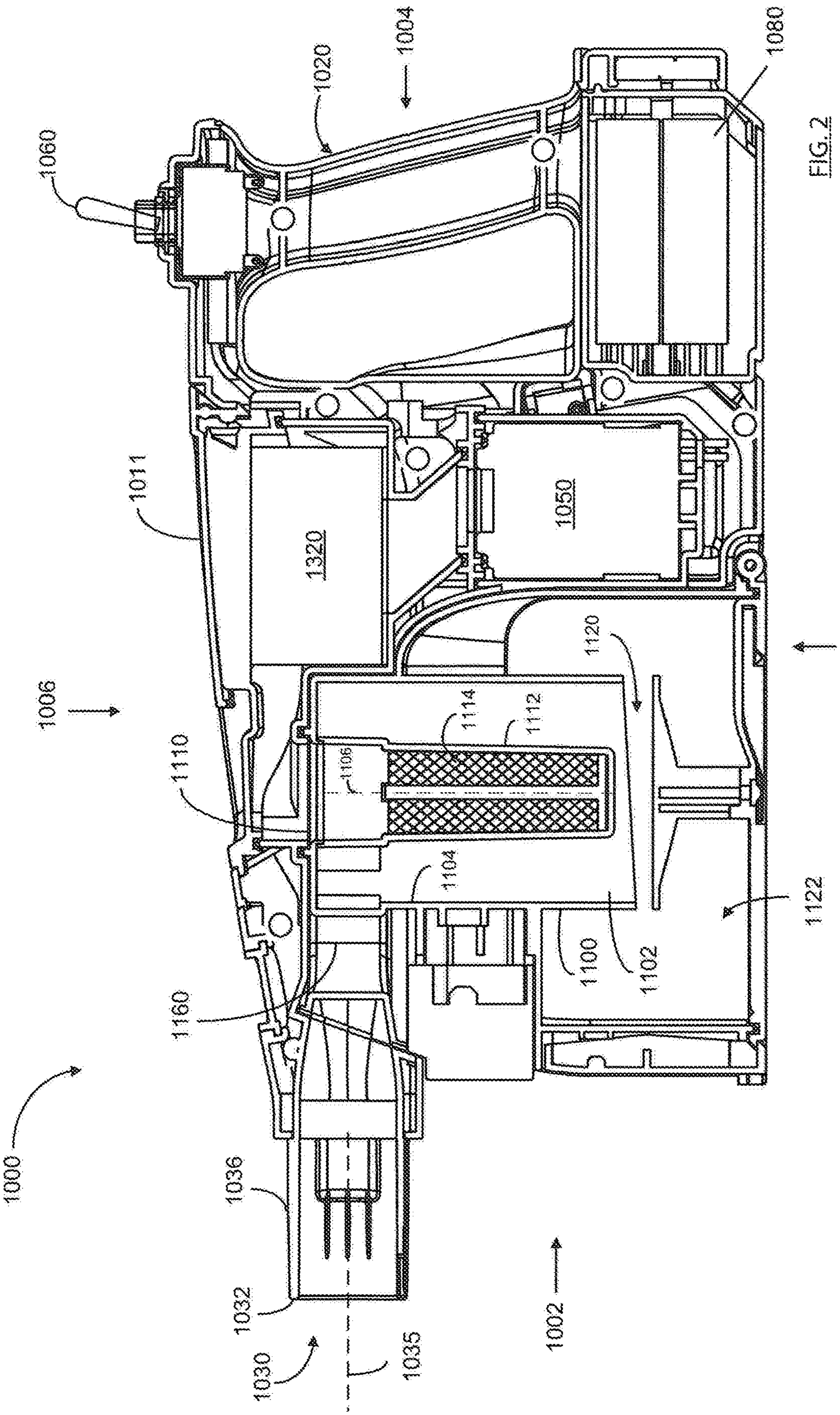
FIG. 2 is a sectional view of the hand vacuum cleaner of FIG. 1, taken along line 2-2 in FIG. 1 with a first example airflow passage.

As exemplified, a power switch 1060 may be provided to selectively control the operation of the suction motor (e.g. either on/off or variable power levels or both), for example by establishing a power connection between the batteries and the suction motor. The power switch may be provided in any suitable configuration and location, including a button, rotary switch, sliding switch, trigger-type actuator and the like. As illustrated in FIG. 2, power switch 1060 is in the form of a switch located toward the upper portion of the rear end 1004 of the hand vacuum cleaner, above the handle 1020. In this position, a user may be able to access the button 1060 while holding the hand vacuum via the hand grip, e.g. with the thumb of the hand holding the handle, and/or with a digit of their other hand.

The power switch 1060 or an alternate controller may also be configured to control other aspects of the hand vacuum (brush motor on/off, etc.). Optionally, instead of being provided at an upper end of the handle, the power switch may be provided on the main body (such as on the motor housing or other suitable location).

An optional information display device may be provided to display one or more visual indications to a user. For example, the display device may provide a visual indication of: when suction motor is on; the current power level of the suction motor (if applicable); the current battery charge level (if applicable); an estimated time until the battery charge will be depleted (if applicable), and/or similar information. The display device may include one or more light sources (e.g. light emitting diodes (LEDs)), display screens (e.g. a liquid crystal, an LED screen, an organic light emitting diode (OLED) screen, and the like. The screen, and associated electronics, may be used to display status information of one or more electrical components of the hand vacuum cleaner.

As exemplified in the embodiments of FIGS. 2-8, hand vacuum cleaners 1000 and 1000A may include a single cyclonic cleaning stage with a cyclone chamber 1102 that has multiple cyclone air inlet passages in fluid communication with (downstream of) the inlet conduit 1036, a cyclone air outlet 1110, and a dirt outlet 1120 that is in communication with a dirt collection chamber 1122.

As described above, the surface cleaning apparatus 1000 (and surface cleaning apparatus 1000A) includes an air flow path extending from the dirty air inlet 1030 to the clean air outlet 1040. The suction motor 1050 and cyclone 1100 are positioned in the air flow path. Air entering the dirt air inlet 1030 is directed to the cyclone chamber 1102 via multiple separate airflow passages.

The cyclone air inlets of cyclone chamber 1102 are provided by the downstream ends of separate airflow passages that are located downstream of the inlet conduit 1036. In the example shown, hand vacuum cleaners 1000 and 1000A include a first airflow passage 1130 and a second airflow passage 1140 having an upstream end that is fluidly connected to a downstream end of the inlet conduit 1036 and a downstream end that is fluidly connected to cyclone chamber 1102.

As exemplified, the cyclone 1100 of the hand vacuum cleaners 1000 and 1000A may optionally be a single cyclonic cleaning stage with bidirectional air flow (i.e. where the cyclone air inlet and cyclone air outlet are at the same end of the cyclone chamber). Alternatively, a 'uniflow' cyclone chamber (i.e. where the cyclone air inlet and cyclone air outlet are at opposite ends of the cyclone chamber) may be used as the air treatment member 1100. Optionally, the cyclone may be an inverted cyclone.

The cyclone chamber 1102 may be oriented in any direction. For example, when surface cleaning apparatus 1000 or 1000A is oriented with the upper end 1106 above the lower end 1108, e.g. positioned generally parallel to a horizontal surface, a central axis or axis of rotation 1106 of the cyclone chamber 1102 may be oriented vertically, as exemplified in FIG. 2. Air in the cyclone chamber 1102 rotates around the central axis 1106 in a defined direction of rotation 1108, shown as clockwise in the illustrated example. In alternative embodiments, the cyclone chamber may be oriented horizontally, or at any angle between horizontal and vertical.

As shown in FIG. 2, the cyclone air outlet 1160 is provided in the upper end wall of the cyclone chamber 1102 and a vertically extending vortex finder conduit 1112 extends from the upper end wall and is aligned with the cyclone air outlet 1160. Optionally, a mesh screen 1114 may be positioned over some or all of the inlet apertures of the vortex finder conduit 1112 to help inhibit lint, hair, and other such debris from entering the vortex finder conduit 1112.

As shown, the cyclone chamber 1102 includes a cyclone chamber sidewall 1104 that extends generally parallel to the cyclone axis 1106. The cyclone chamber sidewall 1104 extends between an upper wall of the cyclone chamber 1102 (adjacent the cyclone outlet 1110) and the dirt outlet 1120. The cyclone air inlet passages may terminate at inlet ports formed in the sidewall 1104.

Figure 3:
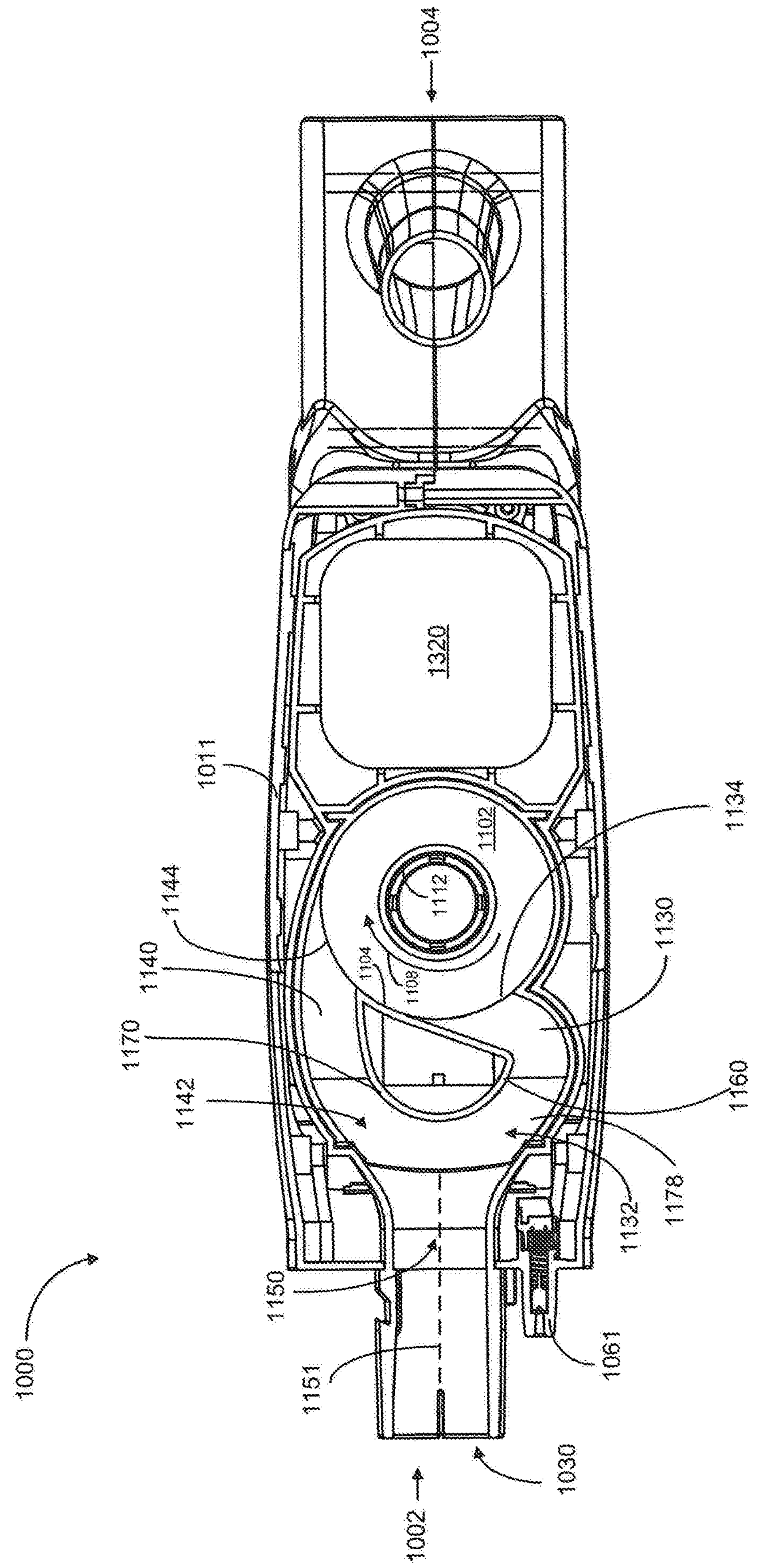
FIG. 3 is a sectional view of the hand vacuum cleaner of FIG. 1, taken along line 3-3 in FIG. 1 with the first example airflow passage.
Figure 4:
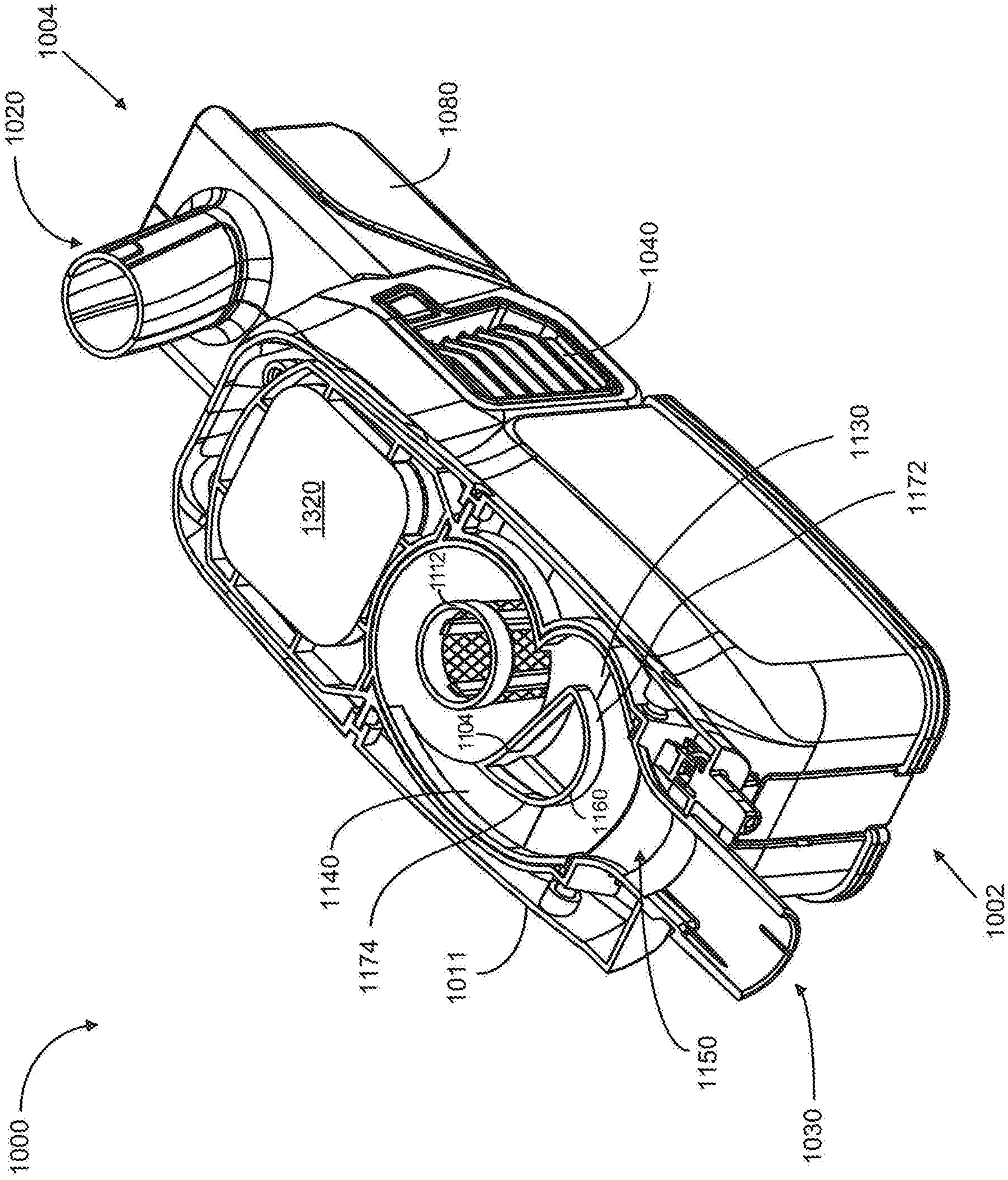
FIG. 4 is a perspective sectional view of the hand vacuum cleaner of FIG. 1, taken along line 3-3 in FIG. 1 with the first example airflow passage.
Figure 5:
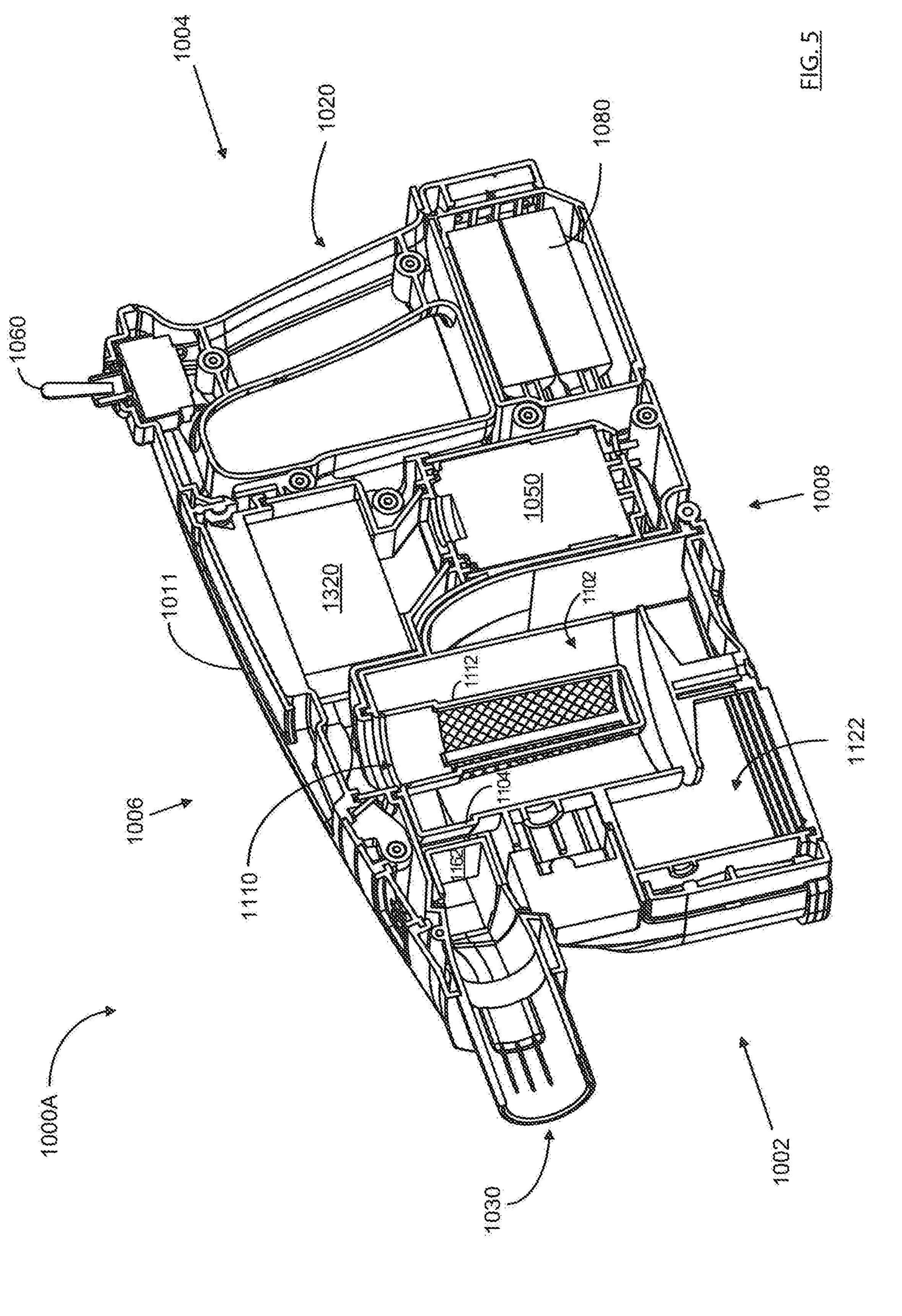
FIG. 5 is a sectional view of the hand vacuum cleaner of FIG. 1, taken along line 2-2 in FIG. 1 with a second example airflow passage.
Figure 6:
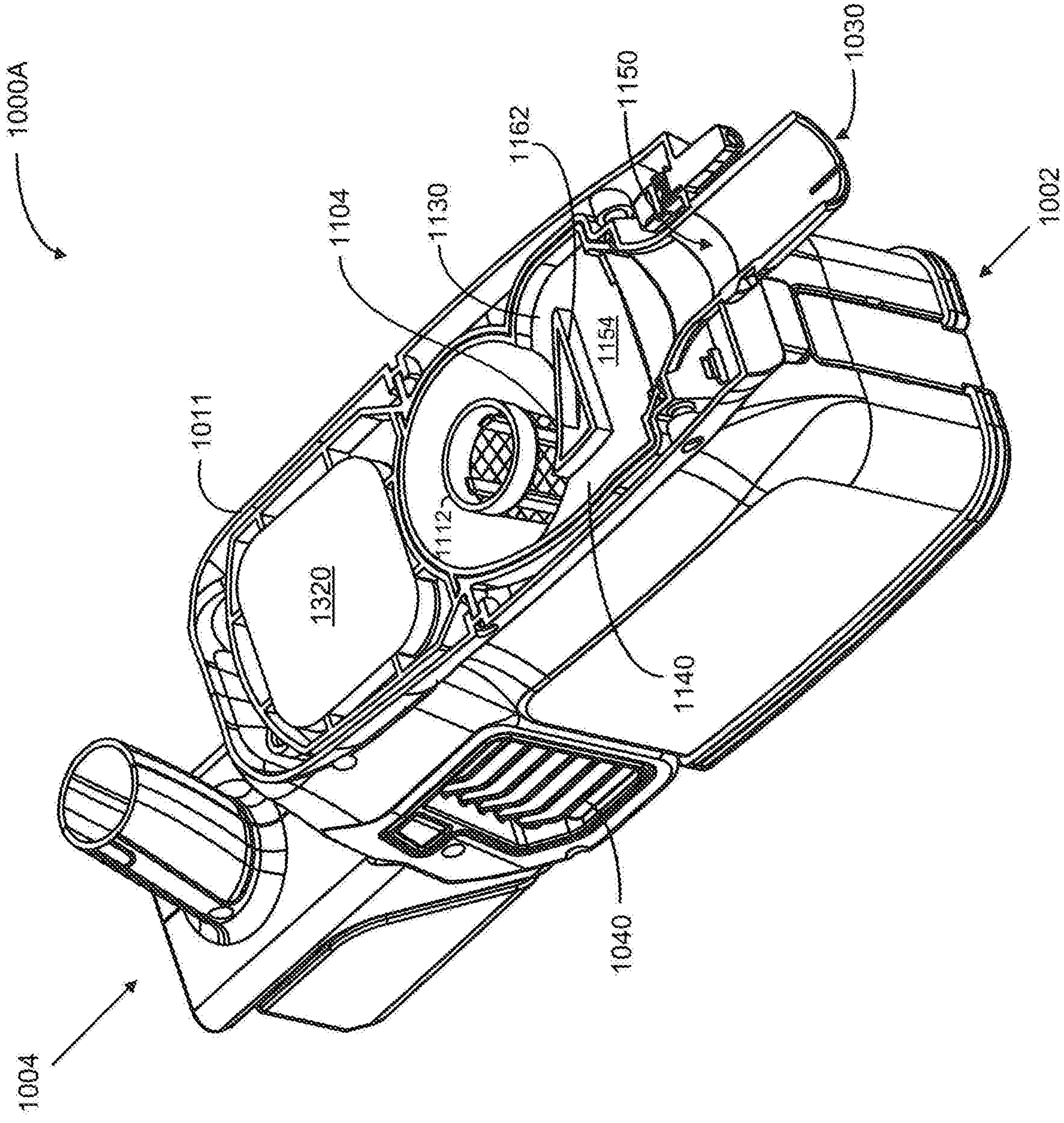
FIG. 6 is a perspective sectional view of the hand vacuum cleaner of FIG. 1, taken along line 3-3 in FIG. 1 with the second example airflow passage.
Figure 7:
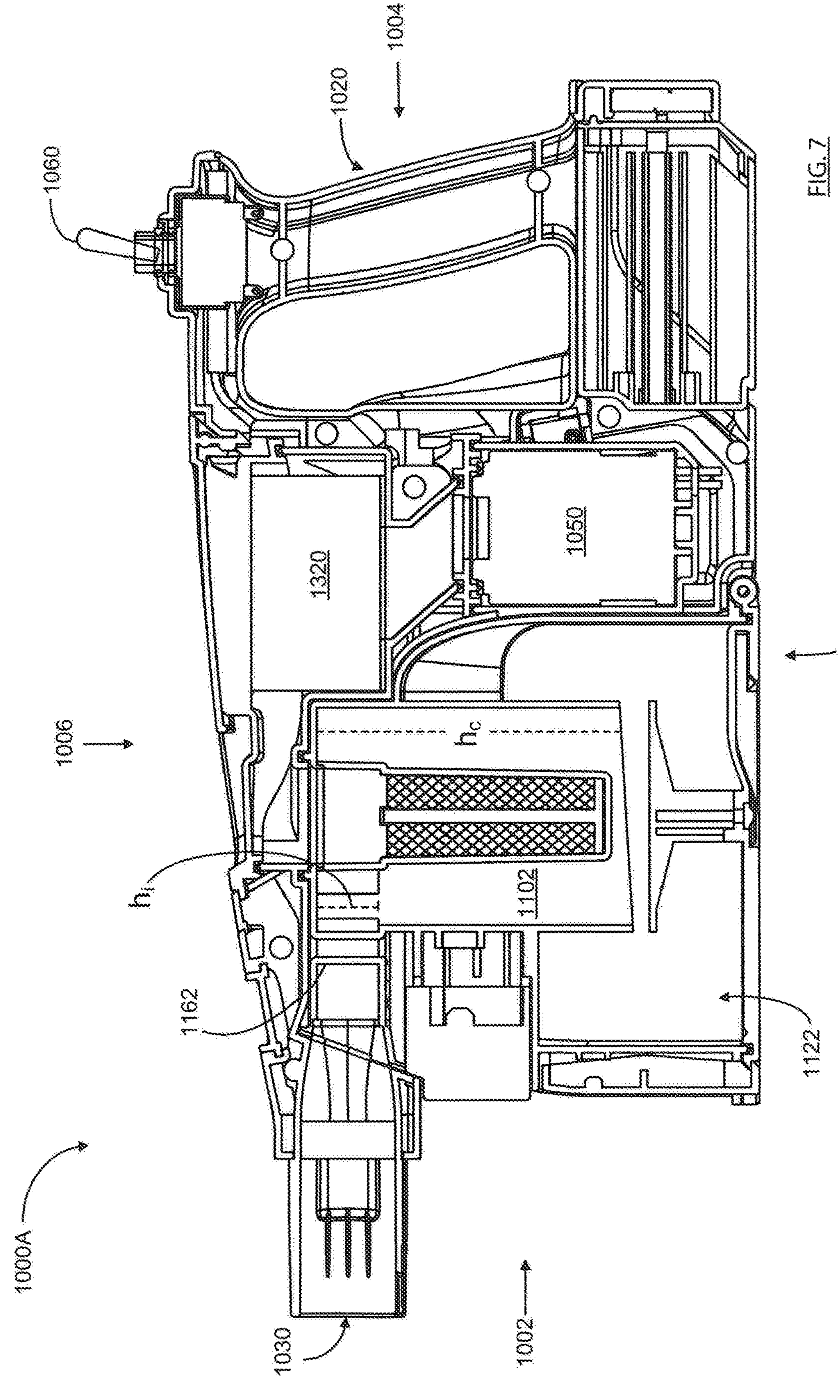
FIG. 7 is a sectional view of the hand vacuum cleaner of FIG. 1, taken along line 2-2 in FIG. 1 with the second example airflow passage.
Figure 8:
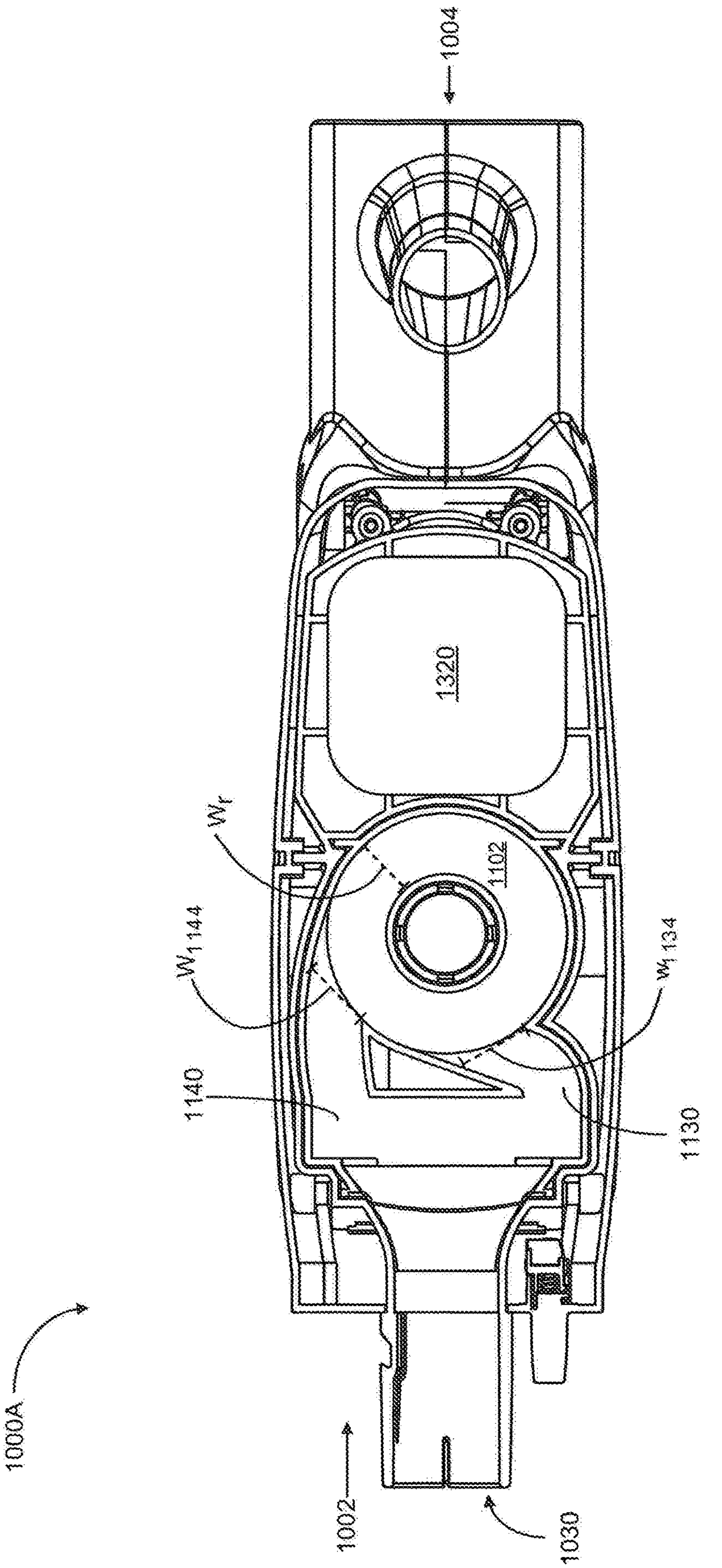
FIG. 8 is a sectional view of the hand vacuum cleaner of FIG. 1, taken along line 3-3 in FIG. 1 with the second example airflow passage.

As exemplified in FIG. 3, the air flow path includes a common airflow passage 1150 positioned upstream of the first airflow passage 1130 and the second airflow passage 1140. Air entering the dirty air inlet 1030 passes through the common airflow passage 1150, then separates into the first airflow passage 1130 and the second airflow passage 1140 before entering the cyclone chamber 1102. As shown in the example of FIG. 3, the common air flow passage 1150 extends from the dirty air inlet 1030 to a divider 1160 separating the first airflow passage 1130 and the second airflow passage 1140 and may thus also be considered the inlet passage 1036.

Alternatively, a common air flow passage 1150 may be omitted. In some such embodiments, separate air flow passages may extend from the dirty air inlet 1030 to the cyclone chamber 1102. See for example FIGS. 9A-D.

The common air flow passage 1150 may extend towards the cyclone chamber 1102. As shown in FIG. 3, the common airflow passage 1150 may have a central axis 1151 that intersects the cyclone chamber 1102. In some examples, the common airflow passage 1150 may extend generally linearly to the first and second airflow passages, i.e. without any bends or turns in the common airflow passage 1150. This may reduce backpressure and airflow losses through the common airflow passage.

Alternatively, the common air flow passage 1150 may extend in an alternative direction, where its central axis does not intersect the cyclone chamber. For instance, the common air flow passage may extend at an angle to the separate air flow passages leading to the cyclone chamber. In such cases, the angle between the common air flow passage and the separated air flow passages may be up to 90°. In this arrangement, for instance where the cyclone axis extends horizontally, air travelling through the hand vacuum cleaner may travel generally rearwardly along a common airflow passage (i.e. parallel to the conduit axis 1035) and then enter a tangential air inlet which essentially changes the direction of the air to travel generally downwardly through the cyclone air inlet (i.e. generally orthogonal to the cyclone axis).

As exemplified in FIG. 3, in hand vacuum cleaner 1000, the divider 1160 is positioned adjacent to the cyclone 1100 at the downstream end of the common airflow passage 1150. Hand vacuum cleaner 1000A (FIG. 8) is generally similar to hand vacuum cleaner 1000, except that in hand vacuum cleaner 1000 divider 1160 is provided by a convex member 1170 rather than divider member 1162, which has a generally straight transverse face that faces the inlet passages 1130 and 1140. In both examples, divider 1160 and divider 1170 divide the air from the common airflow passage 1150 into the first airflow passage 1130 and second airflow passage 1140.

Optionally, the divider 1160 may also define a portion of the cyclone chamber sidewall 1104. This may reduce the space required for the divider 1160, by partially integrating it into the cyclone unit 1100.

The divider 1160 may include separate wall portions for the first airflow passage and the second airflow passage. For instance, the divider 1160 may include a first wall portion 1172 at the upstream inlet end 1132 of the first airflow passage 1130 and a second wall portion 1174 at the upstream inlet end 1142 of the second airflow passage 1140. The first wall portion 1172 may have a different shape from the second wall portion 1174.

In some embodiments, at least a portion of the first airflow passage 1130 may extend in a counter rotational direction as it extends from the divider 1160 to the second tangential air inlet 1134 (see e.g. FIG. 3).

The divider 1160 may define a junction at the downstream end of the common airflow passage 1150. For example, the junction may be a t-shaped junction formed by a divider member 1162 having a substantially straight upstream wall (see e.g. FIG. 6). This may encourage the air to separate between the first air passage 1130 and second air passage 1140, optionally evenly, based on the pressure in each airflow passage.

Alternatively, the divider 1160 may be a convex member 1170 (see e.g. FIG. 3). As shown, the convex member 1170 has an outer surface that extends towards the downstream end of the common airflow passage 1150. Shaping the divider 1160 as a convex member 1170 may help reduce backpressure by redirecting the air flow from the common airflow passage 1150 gradually and avoiding sharp turns or bends in the air flow pathway, which could cause eddy currents.

Alternatively, the divider 1160 may be any suitable member positioned to separate the airflow from the common airflow passage 1150 into multiple downstream airflow passages leading into the cyclone chamber 1102. For example, instead of being convex, walls 1172 and 1174 could meet at an apex point or a generally rounded juncture.

The first airflow passage 1130 extends from an upstream inlet end 1132, positioned at the downstream end of the common airflow passage 1150, to a downstream outlet end 1134. The downstream outlet end 1134, which may be a port or opening in the sidewall of the cyclone, defines one of the cyclone air inlets and may provide a tangential air inlet. Similarly, the second airflow passage 1140 extends from an upstream inlet end 1142 to a downstream outlet end 1144, which may be a port or opening in the sidewall of the cyclone, with the downstream outlet end 1144 defining another cyclone air inlet, which may also be a tangential air inlet.

The second airflow passage 1140 may extend more linearly from the divider 1160 to the second tangential air inlet 1144 than the first airflow passage. Using a more linear path for the second airflow passage may reduce the backpressure on the air in the second airflow passage 1140 by reducing the number of bends in the air flow path. As shown in FIG. 3, the second airflow passage curves slightly in the direction or rotation of air in the cyclone as opposed to a more linear path as exemplified in FIG. 8. It will be appreciated that the first and second air flow paths may have different amounts of curvature.

As shown in the example of FIG. 3, at least a portion 1178 of the first airflow passage 1130 may extend in a counter rotational direction. That is, the first airflow passage 1130 may include a portion that extends in a direction opposite to the direction of rotation 1108 of air in the cyclone 1100. As shown, air in the cyclone 1100 rotates in a clockwise direction 1108. Accordingly, the first airflow passage 1130 includes a portion 1178 that extends in a counterclockwise direction.

As exemplified in FIG. 3, after portion 1178 of the first air flow path curves in a direction counter to the rotational direction in the cyclone as the passage travels along wall 1172, the passage then curves in the rotational direction of air in the cyclone so as to provide a tangential air inlet. In contrast, as exemplified in FIG. 8, the front wall of divider 1162, which is straight, extends towards a lateral side of the cyclone such that, downstream of the front wall, the passage curves in the rotational direction of air in the cyclone so as to provide a tangential air inlet. It will be appreciated that if the front wall had a shorter length, then the upstream end of the first air flow [passage may direct the air in a counter rotational direction.

The volume of air drawn into the cyclone chamber 1102 is limited by the size of the cyclone inlets. By providing two inlets 1134 and 1144, the height of each inlet may be reduced by half as compared to a single inlet cyclone (having the same width as each of the inlets 1134 and 1144), while permitting the same volume of air to be drawn through (i.e. without reducing the total cross-sectional area of the cyclone inlets).

In the example shown, each of the cyclone air inlets provided by the first and second airflow passages have the same inlet height, indicated as $h_i$. Alternatively, the height of the cyclone inlets may be different, which may encourage more air to flow towards the taller inlet (assuming the inlets have the same width).

The height $h_c$ of the cyclone chamber 1102 may be defined as a multiple of the height $h_i$ of each inlet. The height of the cyclone chamber 1102 may be selected based on the number of revolutions through the cyclone chamber 1102 that are desired for sufficient separation of dirt and debris. Height $h_c$ may be about 2-6, 3-5, or 3-4 times the height $h_i$. For instance, the height $h_c$ may be about 3.5-4.5 times the height $h_i$ to allow for 3-4 revolutions as a band of air swirls through the cyclone chamber 1102.

The width of each tangential cyclone inlet 1134 and 1144, indicated as $w_{1134}$ and $w_{1144}$ respectively, also limits the volume of air drawn into the cyclone chamber 1102. One or both of the widths $w_{1134}$ and $w_{1144}$ may be defined to be less than the radial width $w_r$ of the cyclone chamber 1102. The radial width $w_r$ defines the maximum width available for a band of air to circulate within the cyclone chamber 1102. Thus, where the widths $w_{1134}$ and $w_{1144}$ of each of the cyclone inlets 1134 and 1144 are less than, or equal to, the radial width $w_r$ backpressure caused by bands of air squeezing into the cyclone chamber 1102 may be prevented.

Each of the cyclone inlets provided by downstream outlet end 1134 and downstream outlet end 1134 may be positioned as discrete inlets around the perimeter of the cyclone chamber sidewall 1104. For example, the cyclone inlets may be formed as slots or ports in the sidewall 1104. As shown, the upstream outlet end 1144 of the second air flow passage 1140 is positioned downstream from the downstream outlet end 1134 of the first air flow passage 1130, in direction of rotation 1108 of the cyclone chamber 1108, i.e., and are separated from each other by a portion of the sidewall 1104 of the cyclone.

In the example shown, the cyclone air inlets are vertically aligned along the sidewall 1104 of the cyclone chamber 1102. That is, each cyclone air inlet may be located at about the same vertical location in the cyclone chamber 1102. This may ensure that more of the volume of the cyclone chamber 1102 is used, as the bands of air from each cyclone inlet can enter at, or near, the first end of the cyclone chamber 1102. It will be appreciated that the inlets may alternately be vertically staggered.

The tangential air inlet defined by the first airflow passage 1130 may be positioned upstream from the location at which the common airflow passage axis 1151 intersects the cyclone chamber 1102. Shifting the tangential air inlet defined by the first airflow passage 1130 to be upstream of the axis 1151 of the common air flow passage 1150 may further separate the tangential air inlets without requiring sharp turns or bends in the air flow path.

If the inlets to the cyclone 1100 are spaced too closely together, the band of air entering the cyclone 1100 from the second airflow passage 1140 may encounter backpressure from the band of air that entered the cyclone chamber 1102 from the first airflow passage 1130.

Without being limited by theory, air entering the cyclone chamber will commence to rotate in the rotational direction and will commence to spiral downwardly towards the opposed axial end of the cyclone. In addition, the air entering the cyclone may tend to be compressed radially inwardly as it rotates in the cyclone chamber 1102. Therefore, air entering the cyclone chamber 1102 from the second cyclone inlet 1144 may squeeze or compress the band of air from the first airflow passage 1130 that has already entered the cyclone chamber 1102 if the inlets 1134 and 1144 are positioned close together. If the inlets 1134 and 1144 are spaced apart around the sidewall of cyclone chamber 1102, then air entering through the upstream inlet 1134 may be compressed radially inwardly due to its rotation flow by the time that the air has travelled to the radial position of the downstream inlet 1144 and may have moved downwardly from the inlet height of the downstream inlet 1144. Accordingly, the second band of air may encounter less resistance because the first band of air may be vertically displaced and/or compressed as it swirls around the cyclone 1100. A counter-rotational portion 1178 can separate the cyclone inlets provided by the downstream outlet end 1134 from the downstream outlet end 1144 of the second airflow passage 1140, without the need for an extended conduit around the cyclone 1100.

In the example shown, the downstream outlet end 1134 of the first airflow passage 1130 defines a substantially tangential air inlet to the cyclone chamber 1102. As with the first airflow passage 1130, the downstream outlet end 1144 of the second airflow passage 1140 defines a tangential air inlet to the cyclone chamber 1102. Tangential air inlets may reduce air flow losses within the air flow path.

In alternative embodiments, the surface cleaning apparatus 1000/1000A may omit divider 1060. That is, the surface cleaning apparatus 1000 may not include a divider member that defines a junction at the downstream end of a common airflow passage. For instance, the common airflow passage may terminate with the first and second airflow passage may extending from the outlet end of the common airflow passage. In such a case, the upstream end of the first and second air flow paths may extend in parallel with a wall separating them. In some cases, the common airflow passage may even be omitted, and the separate airflow passages may extend from the dirty air inlet 1030 to the cyclone chamber 1102.

FIGS. 9-15 exemplifies various examples of cyclone units with multiple cyclone inlets. The cyclone units shown in FIGS. 9-15 may be used with surface cleaning apparatuses, such as the hand vacuum cleaners 1000 and 1000A described herein above. Alternately, the cyclone units shown in FIGS. 9-15 may be used with any surface cleaning apparatus, such as an upright surface cleaning apparatus, a stick vac, a canister surface cleaning apparatus, an extractor or the like. In the examples shown in FIGS. 9-15, a dividing member need not be used to provide a junction separating the airflow passages.

FIGS. 9A-9D illustrate an example configuration of a cyclone unit 1200 having a pair of cyclone inlets 1234 and 1244. The cyclone unit 1200 includes a cyclone chamber 1202 and a dirt collection region 1222. In the example of cyclone unit 1200, the cyclone chamber 1202 and dirt collection region 1222 are in a side-by-side configuration, with the dirt collection region partially surrounding the cyclone chamber 1202.

The cyclone unit 1200 may be positioned in the airflow path of a surface cleaning apparatus such as surface cleaning apparatuses 1000 and 1000A. Air from a dirty air inlet can be drawn through the cyclone unit 1200 using a suction motor positioned in the air flow path, and the treated air can subsequently be exhausted out a clean air outlet.

Figure 9A:
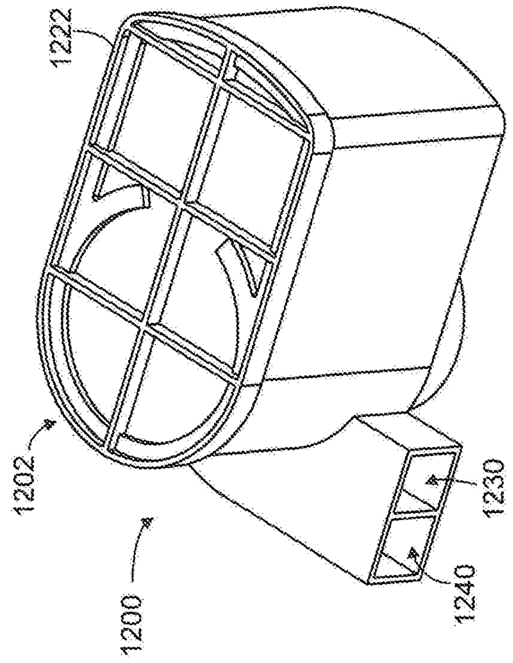
FIG. 9A is a top perspective view of an example cyclone and airflow passage for a vacuum cleaner in accordance with an embodiment.
Figure 9B:
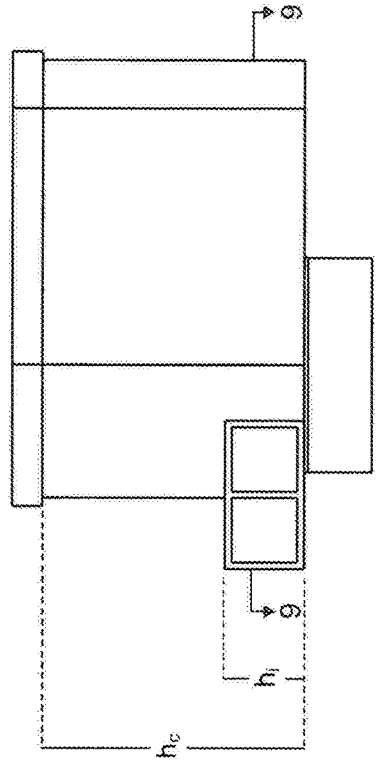
FIG. 9B is a front view of the example cyclone and airflow passage of FIG. 9A.
Figure 9C:
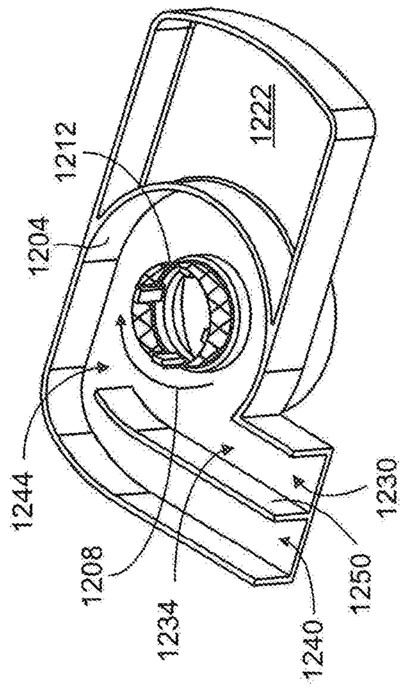
FIG. 9C is a perspective sectional view of the example cyclone and airflow passage of FIG. 9A, taken along line 9-9 in FIG. 9B.
Figure 9D:
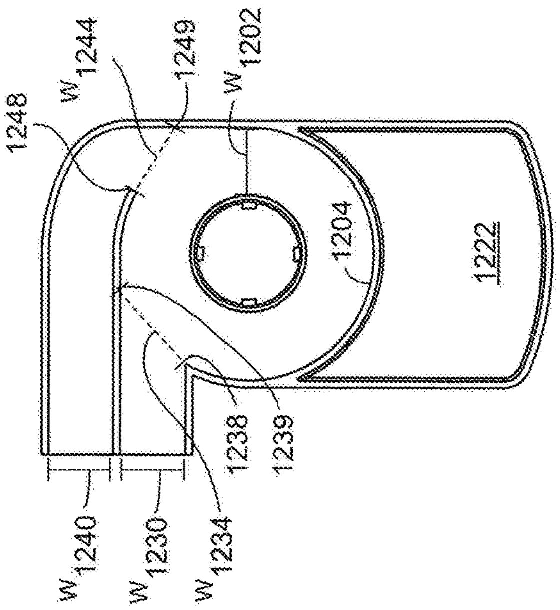
FIG. 9D is a sectional view of the example cyclone and airflow passage of FIG. 9A, taken along line 9-9 in FIG. 9B.

As with the cyclone chamber 1102 of surface cleaning apparatus 1000, the cyclone chamber 1202 includes a cyclone chamber sidewall 1204 that extends generally parallel to the cyclone axis (not shown, but extending into and out of the page in FIG. 9D). The air inlets to the cyclone chamber 1202 may include inlet ports formed in the sidewall 1204.

As with the surface cleaning apparatus 1000, the cyclone unit 1200 includes a vertically extending vortex finder conduit 1212, which may be provided with a screen or mesh material at the inlet to the vortex finder. The vortex finder conduit 1212 extends in a direction generally parallel to the cyclone axis. In some cases, as in FIG. 9, the cyclone axis may be located at the center of the vortex finder conduit 1212.

A plurality of airflow passages are connected to the cyclone chamber 1202. Each of the airflow passages may be fluidly isolated from one another. In the example of FIGS. 9A-9D, a first airflow passage 1230 and a second airflow passage 1240 are connected to the cyclone chamber 1202. The first airflow passage 1230 is isolated from the second airflow passage 1240 by a common wall 1250.

The first airflow passage 1230 extends from an upstream inlet (not shown) to a downstream outlet 1234 that defines a cyclone air inlet. Similarly, the second airflow passage 1240 extends from an upstream inlet (not shown) to a downstream outlet 1244 that defines a second cyclone air inlet. Each of the first cyclone air inlet 1234 and the second cyclone air inlet 1244 may be tangential air inlets that direct air into the cyclone chamber 1202 in the direction of rotation 1208 of the cyclone chamber 1202.

As shown in FIG. 9D, the first tangential air inlet 1234 has an upstream edge 1238 and a downstream edge 1239. The upstream edge 1238 is upstream from the downstream edge 1239 in the direction of rotation 1208 of the cyclone chamber 1202. This allows the air from the first air flow passage 1230 to enter the cyclone chamber 1202 as a band that is aligned with the direction of rotation 1208 of air within the cyclone.

The second tangential air inlet 1244 also has an upstream edge 1248 and a downstream edge 1249. The upstream edge 1248 is upstream from the downstream edge 1249 in the direction of rotation 1208 of the cyclone chamber 1202. This allows the air from the second air flow passage 1240 to enter the cyclone chamber 1202 as a band that is aligned with the direction of rotation 1208 of air within the cyclone. Each of the tangential air inlets may be positioned at the same height within the cyclone chamber, as shown.

The width $w_{1234}$ of the first tangential air inlet 1234 is defined by the distance between the upstream edge 1238 and the downstream 1239, and here corresponds to the width $w_{1230}$ of the first air flow passage 1230. The width $w_{1244}$ of the second tangential air inlet 1244 is defined by the distance between the upstream edge 1248 and the downstream 1249, and here corresponds to the width $w_{1240}$ of the second air flow passage 1240. As explained above, the width $w_{1234}$ can be equal to, or less than, a radial width $w_{1202}$ of the cyclone chamber 1202. Similarly, the width $w_{1244}$ of the second tangential air inlet 1240 may be less than, or equal to, the radial width $w_{1202}$. In the example shown, the widths $w_{1234}$ and $w_{1244}$ are each substantially equal to the radial width $w_{1202}$ of the cyclone chamber 1202. By providing separate cyclone air inlets 1234 and 1244, the height $h_i$ of each inlet can be reduced, in turn providing a reduced height $h_c$ for the cyclone unit 1200.

The first airflow passage 1230 and the second airflow passage 1240 may terminate on the exterior of the cyclone chamber sidewall 1204. As shown, both airflow passages terminate with a cyclone air inlet at the location of the cyclone chamber sidewall 1204. The first tangential air inlet 1244 and the second tangential air inlet 1244 are provided as slots or ports in the sidewall 1204 of the cyclone chamber. The second tangential air inlet 1244 is positioned around the perimeter of the cyclone chamber sidewall 1204 downstream from the first tangential air inlet 1244 in the direction of rotation 1208.

Each of the first tangential air inlet 1234 and the second tangential air inlet 1244 direct air into the cyclone chamber 1204 in a direction perpendicular to the axis of the cyclone unit 1202. In other words, a plane transverse to the cyclone axis extends through the first and second tangential air inlets 1234/1244.

In some embodiments, the upstream edge 1248 of the second tangential air inlet 1244 may be positioned adjacent to the downstream edge 1239 of the first tangential air inlet 1234. This may reduce the length of the second airflow passage 1234. This may also allow additional cyclone air inlets to be spaced around the cyclone chamber 1202.

Alternatively, the upstream edge 1248 of the second tangential air inlet 1244 may be spaced apart from the downstream edge 1239 of the first tangential air inlet 1234 as shown in FIG. 9. A portion of the sidewall 1204 may be positioned between the upstream edge 1248 and the downstream edge 1239. This may provide separation between the bands of air entering the cyclone chamber 1202 from the first airflow passage 1230 and the second airflow passage 1240, which may allow the air bands to diverge vertically.

In some embodiments, the downstream portion of one or more of the airflow passages may be generally linear approaching the cyclone chamber 1202. As shown in the example of FIG. 9, the downstream portion of the first airflow passage 1240 extends in a generally linear direction towards the cyclone chamber 1202. In some embodiments (such as FIG. 10 below), the downstream portion of the second airflow passage 1240 may also be generally linear.

In some embodiments, a portion of one or both of the airflow passages may extend in a direction generally parallel to the cyclone axis. For example, a hand vacuum cleaner in which the cyclone is horizontally oriented may include a portion of both of the airflow passages that also extend horizontally as dirty air travels from a dirty air inlet positioned like that shown in surface cleaning apparatus 1000. Alternatively, the air flow passages may always extend perpendicular to, or at an angle to, the cyclone axis (e.g. as with surface cleaning apparatus 1000).

The portions of the airflow passages extending parallel to the cyclone axis may be adjacent one another. These airflow passages may abut one another, e.g. on opposite sides of a common separating wall, such as wall 1250.

The first airflow passage 1230 and the second airflow passage 1240 may extend upstream to a dirty air inlet of the surface cleaning apparatus, such as dirty air inlet 1030 described herein above. This would provide separate dirty air inlets (e.g., the upstream ends shown in FIG. 9A may be the dirty air inlets to the surface cleaning apparatus). An advantage of this design is that larger dirt that cannot pass through one of air flow paths 1230, 1240 cannot enter the surface cleaning apparatus and produce a clog. In some cases, both the first airflow passage 1230 and the second airflow passage 1240 may have an inlet end that is in fluid communication with a downstream end of a single upstream airflow conduit (not shown). This upstream airflow conduit may in turn fluidly communication with the dirty air inlet 1030.

Figure 12A:
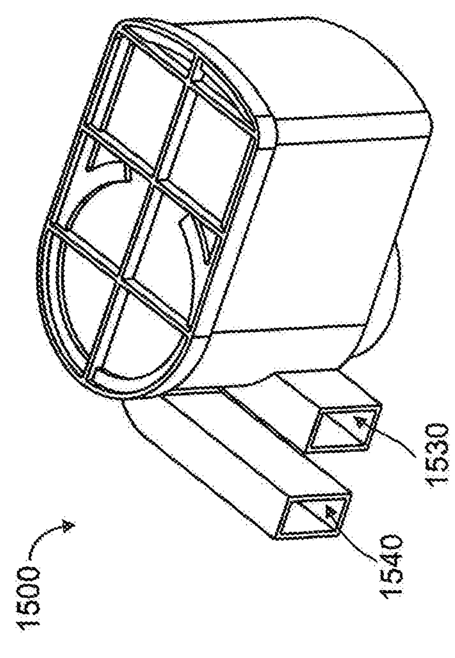
FIG. 12A is a top perspective view of an example cyclone and airflow passage for a vacuum cleaner in accordance with an embodiment.
Figure 12B:
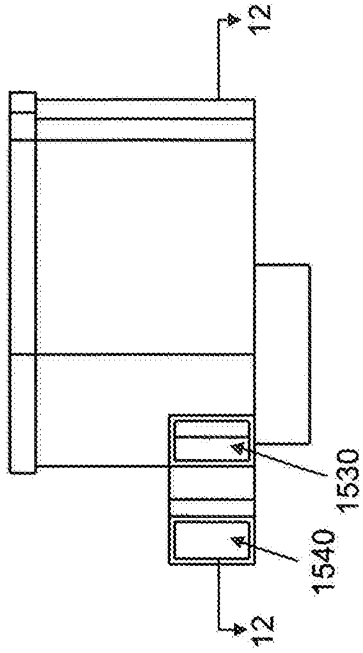
FIG. 12B is a front view of the example cyclone and airflow passage of FIG. 12A.

FIGS. 10A-10D illustrate another example configuration of a cyclone unit 1300 that may be used with a surface cleaning apparatus, such as surface cleaning apparatuses 1000 and 1000A. The cyclone unit 1300 includes a cyclone chamber 1302 and a dirt collection region 1322. As with cyclone unit 1200, cyclone unit 1300 has a pair of cyclone inlets 1334 and 1344. However, in cyclone unit 1300 the first airflow passage 1330 is spaced apart from the second airflow passage 1340 by one or more spacers 1351. Optionally, as shown in FIG. 12A, a spacer may be omitted when the airflow passages are spaced apart.

As with cyclone chamber 1202, the cyclone chamber 1302 includes a cyclone chamber sidewall 1304 that extends generally parallel to the cyclone axis 1306. The air inlets to the cyclone chamber 1302 may include inlet ports formed in the sidewall 1304. The cyclone chamber 1300 also includes a vertically extending vortex finder conduit 1312.

In the example of FIGS. 10A-10D, a first airflow passage 1330 and a second airflow passage 1340 are connected to the cyclone chamber 1302. The first airflow passage 1330 extends, e.g., from a downstream end of a common inlet passage (not shown) to a downstream outlet 1334 that defines a first tangential cyclone air inlet. Similarly, the second airflow passage 1340 extends, e.g., from a downstream end of a common inlet passage (not shown) to a downstream outlet 1344 that defines a second tangential cyclone air inlet.

Figure 10D:
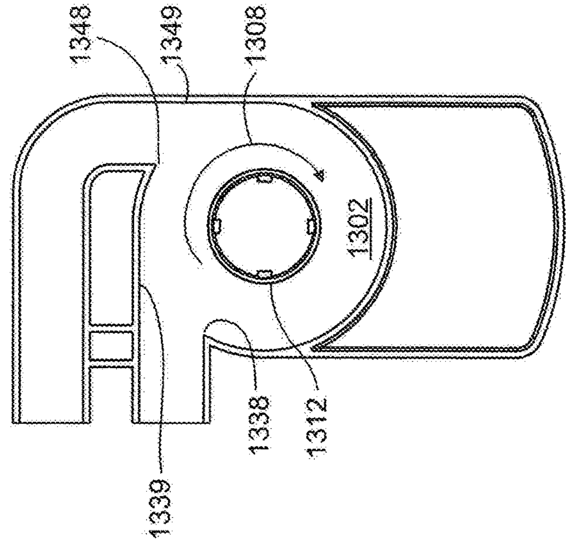
FIG. 10D is a sectional view of the example cyclone and airflow passage of FIG. 10A, taken along line 10-10 in FIG. 10B.
Figure 10B:
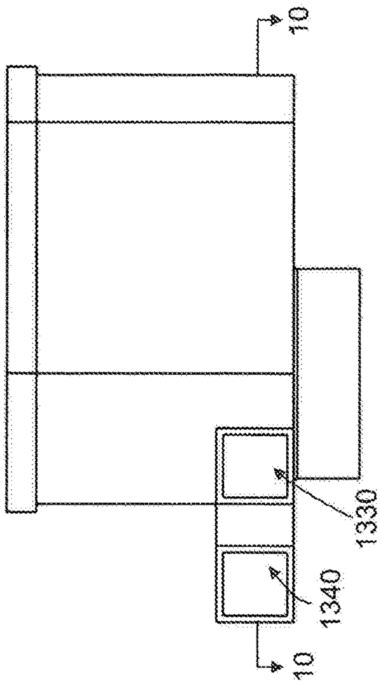
FIG. 10B is a front view of the example cyclone and airflow passage of FIG. 10A.
Figure 10C:
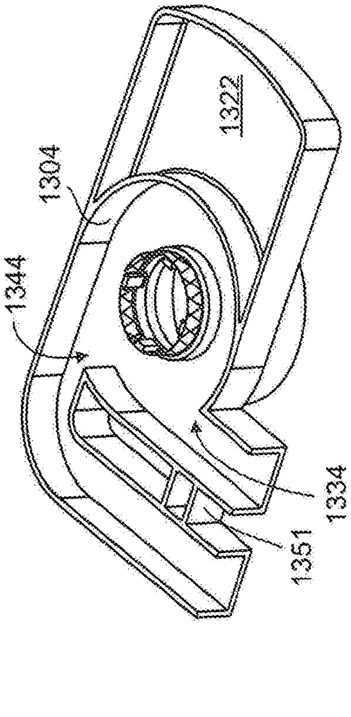
FIG. 10C is a perspective sectional view of the example cyclone and airflow passage of FIG. 10A, taken along line 10-10 in FIG. 10B.
Figure 10A:
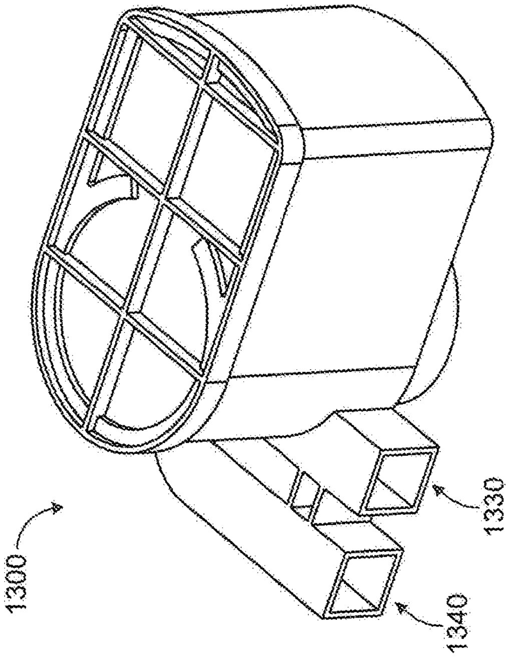
FIG. 10A is a top perspective view of an example cyclone and airflow passage for a vacuum cleaner in accordance with an embodiment.

As shown in FIG. 10C, the first tangential air inlet 1334 extends between an upstream edge 1338 and a downstream edge 1339 that is downstream from the upstream edge 1338 in the direction of rotation 1308 of the cyclone chamber 1302. The second tangential air inlet 1344 also extends between an upstream edge 1348 and a downstream edge 1349 that is downstream from the upstream edge 1348 in the direction of rotation 1308. Each of the tangential air inlets may be positioned at the same height within the cyclone chamber 1302, as shown.

In the example of FIGS. 10A-10D, the first airflow passage 1330 is isolated from the second airflow passage 1340 and is spaced apart therefrom. This may facilitate providing the second airflow passage 1340 with a generally linear downstream portion leading up to the second cyclone air inlet 1344, without providing a conduit that extends far around the cyclone chamber 1302.

FIGS. 11A-11D illustrate another example configuration of a cyclone unit 1400 that may be used with a surface cleaning apparatus, such as surface cleaning apparatuses 1000 and 1000A. The cyclone unit 1400 includes a cyclone chamber 1402 and a dirt collection region 1422. As with cyclone unit 1200, cyclone unit 1400 has a pair of cyclone inlets 1434 and 1444. However, in cyclone unit 1400 the second tangential air inlet 1444 is spaced about half way around the perimeter of the cyclone chamber sidewall 1404 from the first tangential air inlet 1434.

As with cyclone chamber 1202, the cyclone chamber 1402 includes a cyclone chamber sidewall 1404 that extends generally parallel to the cyclone axis 1406. The air inlets to the cyclone chamber 1402 may include inlet ports formed in the sidewall 1404. The cyclone chamber 1400 also includes a vertically extending vortex finder conduit 1412.

In the example of FIGS. 11A-11D, a first airflow passage 1430 and a second airflow passage 1440 are connected to the cyclone chamber 1402. The first airflow passage 1430 extends, e.g., from a downstream end of a common inlet passage (not shown) to a downstream outlet 1434 that defines a first tangential cyclone air inlet. Similarly, the second airflow passage 1440 extends, e.g., from a downstream end of a common inlet passage (not shown) to a downstream outlet 1444 that defines a second tangential cyclone air inlet.

Figure 11D:
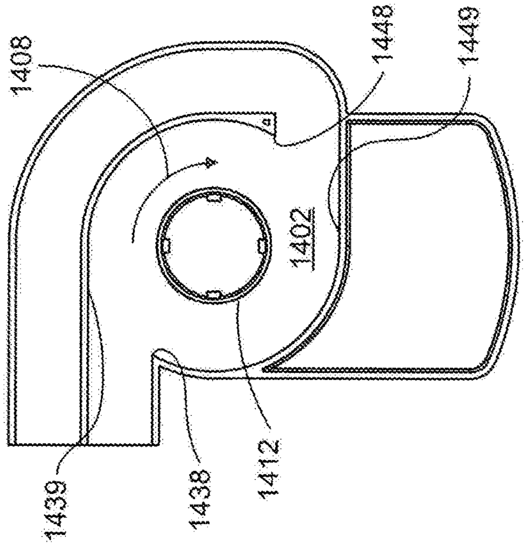
FIG. 11D is a sectional view of the example cyclone and airflow passage of FIG. 11A, taken along line 11-11 in FIG. 11B.
Figure 11B:
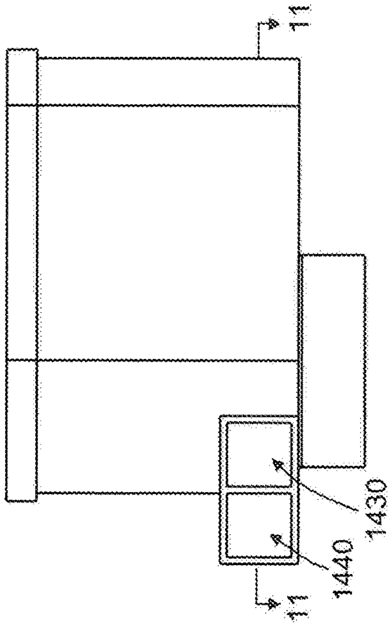
FIG. 11B is a front view of the example cyclone and airflow passage of FIG. 11A.
Figure 11C:
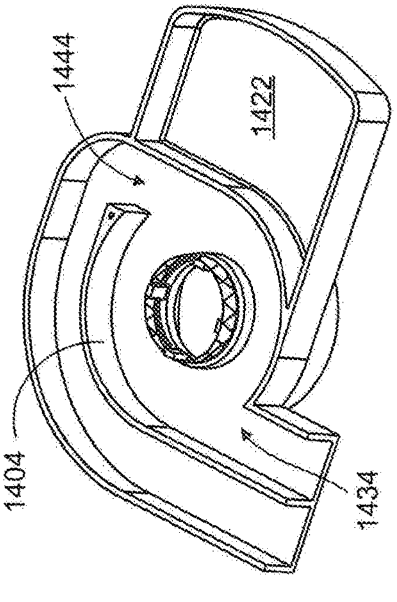
FIG. 11C is a perspective sectional view of the example cyclone and airflow passage of FIG. 11A, taken along line 11-11 in FIG. 11B.

As shown in FIG. 11C, the first tangential air inlet 1434 extends between an upstream edge 1438 and a downstream edge 1439 that is downstream from the upstream edge 1438 in the direction of rotation 1408 of the cyclone chamber 1402. The second tangential air inlet 1444 also extends between an upstream edge 1448 and a downstream edge 1449 that is downstream from the upstream edge 1448 in the direction of rotation 1408. Each of the tangential air inlets may be positioned at the same height within the cyclone chamber, as shown.

Figure 11A:
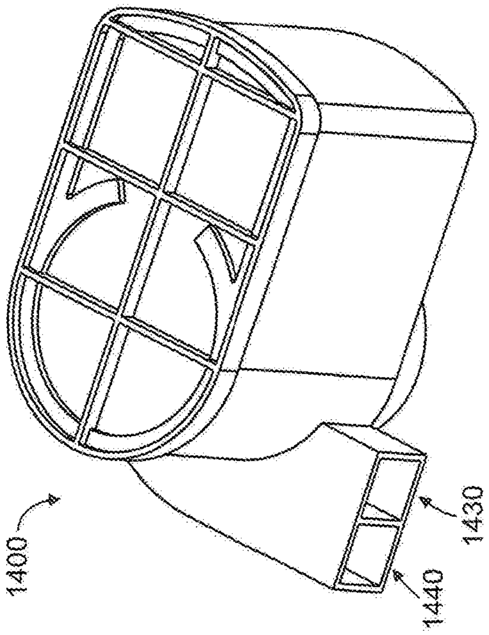
FIG. 11A is a top perspective view of an example cyclone and airflow passage for a vacuum cleaner in accordance with an embodiment.

In the example of FIGS. 11A-11B, the second tangential air inlet 1444 is positioned approximately opposite the first tangential air inlet 1444. This may allow the air band that enters from the first tangential air inlet 1444 to be displaced within the cyclone chamber by a greater extent before it reaches the location of the second tangential air inlet 1434 around the perimeter of the sidewall 1404. For this reason, the height of the cyclone chamber may be approximately half $h_i$ compared to a cyclone having a single air inlet.

FIGS. 12A-12D illustrate another example configuration of a cyclone unit 1500 that may be used with a surface cleaning apparatus, such as surface cleaning apparatuses 1000 and 1000A. The cyclone unit 1500 includes a cyclone chamber 1502 and a dirt collection region 1522. As with cyclone unit 1300, cyclone unit 1500 has a pair of cyclone inlets 1534 and 1544 provided at the downstream end of spaced apart air passages 1530 and 1540. However, in cyclone unit 1500 the width of each airflow passage 1530 and 1540 (indicated as $w_{1530}$ and $w_{1540}$ respectively), as well as each cyclone inlet 1534 and 1544 is less than the radial width $w_{1502}$ of the cyclone chamber 1502. In the example shown, the width of each cyclone inlet is about half the radial width $w_{1502}$ of the cyclone chamber 1502.

Reducing the width of the cyclone inlets to less than the radial width of the cyclone chamber 1502 may allow the inlets to be positioned more closely together without their air bands interfering with one another. This, in turn, may allow additional cyclone inlets to be positioned around the cyclone chamber 1502 to increase the volume of air that can be drawn into the cyclone chamber 1502.

As with cyclone chamber 1202, the cyclone chamber 1502 includes a cyclone chamber sidewall 1504 that extends generally parallel to the cyclone axis 1506. The air inlets to the cyclone chamber 1502 may include inlet ports formed in the sidewall 1504. The cyclone chamber 1500 also includes a vertically extending vortex finder conduit 1512.

In the example of FIGS. 12A-12D, a first airflow passage 1530 and a second airflow passage 1540 are connected to the cyclone chamber 1502. The first airflow passage 1530 extends, e.g., from a downstream end of a common inlet passage (not shown) to a downstream outlet 1534 that defines a first tangential cyclone air inlet. Similarly, the second airflow passage 1540 extends, e.g., from a downstream end of a common inlet passage (not shown) to a downstream outlet 1544 that defines a second tangential cyclone air inlet.

Figure 12C:
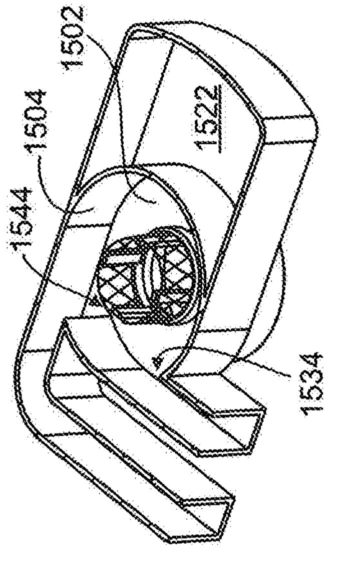
FIG. 12C is a perspective sectional view of the example cyclone and airflow passage of FIG. 12A, taken along line 12-12 in FIG. 12B.
Figure 12D:
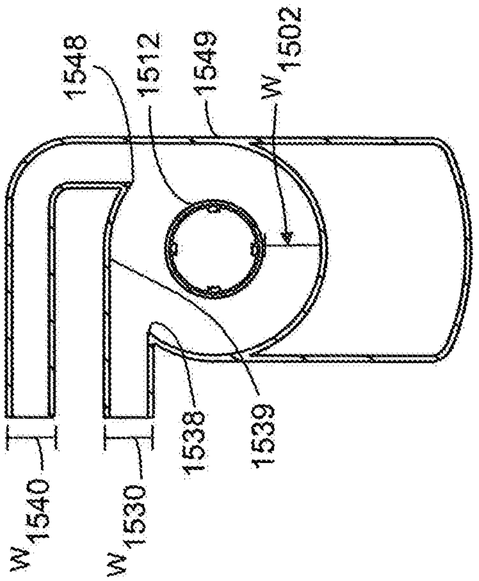
FIG. 12D is a sectional view of the example cyclone and airflow passage of FIG. 12A, taken along line 12-12 in FIG. 12B.

As shown in FIG. 12C, the first tangential air inlet 1534 extends between an upstream edge 1538 and a downstream edge 1539 that is downstream from the upstream edge 1538 in the direction of rotation 1508 of the cyclone chamber 1502. The second tangential air inlet 1544 also extends between an upstream edge 1548 and a downstream edge 1549 that is downstream from the upstream edge 1548 in the direction of rotation 1508. Each of the tangential air inlets may be positioned at the same height within the cyclone chamber, as shown.

FIGS. 13A-13D illustrate another example configuration of a cyclone unit 1600 that may be used with a surface cleaning apparatus, such as surface cleaning apparatuses 1000 and 1000A. The cyclone unit 1600 includes a cyclone chamber 1602 and a dirt collection region 1622. As with cyclone unit 1300, cyclone unit 1600 has a pair of cyclone inlets 1634 and 1644 provided at the downstream end of spaced apart air passages 1630 and 1640. However, in cyclone unit 1600 the width of the first airflow passage 1630 (indicated as $w_{1630}$) is different from the width of the second airflow passage 1640 (indicated as $w_{1640}$).

As shown, the width of the first airflow passage 1630 and cyclone inlet 1634 is less than the radial width $w_{1602}$ of the cyclone chamber 1602. In the example shown, the width of the first cyclone inlet 1634 is about half the radial width $w_{1602}$ of the cyclone chamber 1602. However, the width of the second airflow passage 1640 and second cyclone inlet 1644 is about the same as the radial width $w_{1602}$ of the cyclone chamber 1602. This may allow a greater volume of air to enter via the second cyclone inlet 1644 with less backpressure from the band of air that entered the cyclone chamber 1602 via the first cyclone inlet 1634.

As with cyclone chamber 1202, the cyclone chamber 1602 includes a cyclone chamber sidewall 1604 that extends generally parallel to the cyclone axis 1606. The air inlets to the cyclone chamber 1602 may include inlet ports formed in the sidewall 1604. The cyclone chamber 1600 also includes a vertically extending vortex finder conduit 1612.

In the example of FIGS. 13A-13D, a first airflow passage 1630 and a second airflow passage 1640 are connected to the cyclone chamber 1602. The first airflow passage 1630 extends, e.g., from a downstream end of a common inlet passage (not shown) to a downstream outlet 1634 that defines a first tangential cyclone air inlet. Similarly, the second airflow passage 1640 extends, e.g., from a downstream end of a common inlet passage (not shown) to a downstream outlet 1644 that defines a second tangential cyclone air inlet.

Figure 13A:
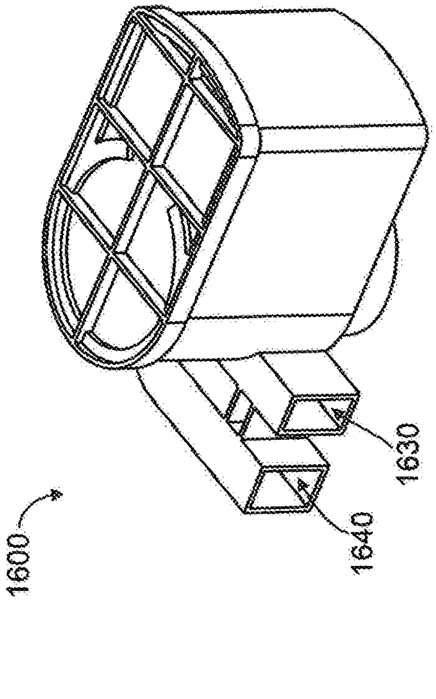
FIG. 13A is a top perspective view of an example cyclone and airflow passage for a vacuum cleaner in accordance with an embodiment.
Figure 13B:
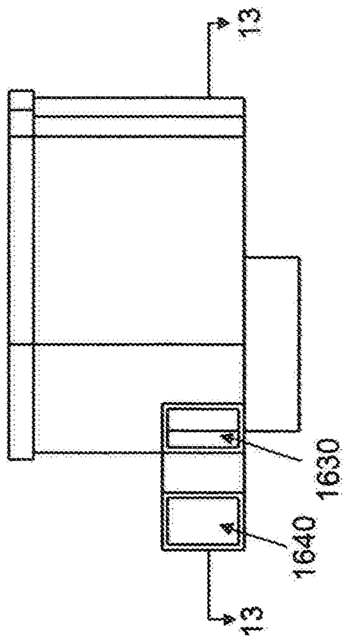
FIG. 13B is a front view of the example cyclone and airflow passage of FIG. 13A.
Figure 13C:
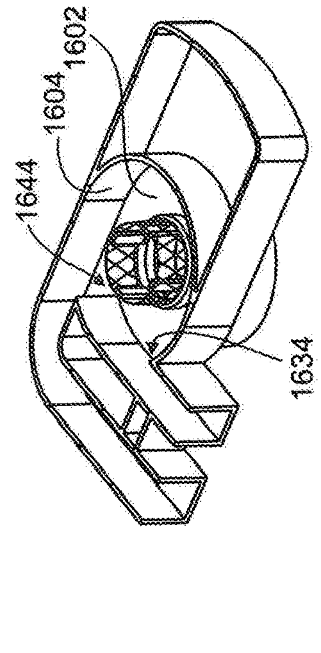
FIG. 13C is a perspective sectional view of the example cyclone and airflow passage of FIG. 13A, taken along line 13-13 in FIG. 13B.
Figure 13D:
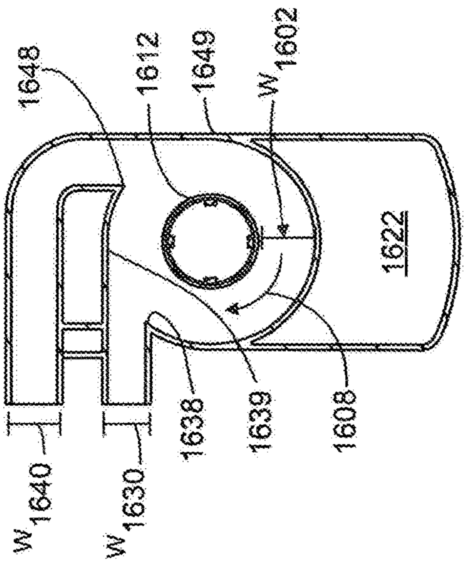
FIG. 13D is a sectional view of the example cyclone and airflow passage of FIG. 13A, taken along line 13-13 in FIG. 13B.

As shown in FIG. 13C, the first tangential air inlet 1634 extends between an upstream edge 1638 and a downstream edge 1639 that is downstream from the upstream edge 1638 in the direction of rotation 1608 of the cyclone chamber 1602. The second tangential air inlet 1644 also extends between an upstream edge 1648 and a downstream edge 1649 that is downstream from the upstream edge 1648 in the direction of rotation 1608. Each of the tangential air inlets may be positioned at the same height within the cyclone chamber, as shown.

FIGS. 14A-14D illustrate another example configuration of a cyclone unit 1700 that may be used with a surface cleaning apparatus, such as surface cleaning apparatuses 1000 and 1000A. The cyclone unit 1700 includes a cyclone chamber 1702 and a dirt collection region 1722.

The cyclone unit 1700 includes three cyclone inlets 1734, 1744 and 1774 positioned at the downstream end of first, second and third separate airflow passages 1730, 1740, and 1770 respectively. As shown in the example of FIGS. 14A-14D, the first airflow passage 1730 is spaced apart from the second airflow passage 1740. This may facilitate providing a linear downstream portion in the second airflow passage 1740. As shown, the second airflow passage 1740 and third airflow passage 1770 are adjacent one another, but separated by a dividing wall.

As shown, the width of each airflow passage 1730, 1740, and 1770 is less than the radial width of the cyclone chamber 1702. This may facilitate air bands entering from additional outlets positioned substantially aligned around the perimeter of the cyclone chamber sidewall 1704.

As with cyclone chamber 1202, the cyclone chamber 1702 includes a cyclone chamber sidewall 1704 that extends generally parallel to the cyclone axis. The air inlets to the cyclone chamber 1702 may include inlet ports formed in the sidewall 1704. The cyclone chamber 1700 also includes a vertically extending vortex finder conduit 1712.

In the example of FIGS. 14A-14D, a first airflow passage 1730, a second airflow passage 1740, and a third airflow passage 1770 are connected to the cyclone chamber 1702. The first airflow passage 1730 extends, e.g., from a downstream end of a common inlet passage (not shown) to a downstream outlet 1734 that defines a first tangential cyclone air inlet. The second airflow passage 1740 extends, e.g., from a downstream end of a common inlet passage (not shown) to a downstream outlet 1744 that defines a second tangential cyclone air inlet. The third airflow passage 1770 also extends, e.g., from a downstream end of a common inlet passage (not shown) to a downstream outlet 1774 that defines a third tangential cyclone air inlet.

Figure 14D:
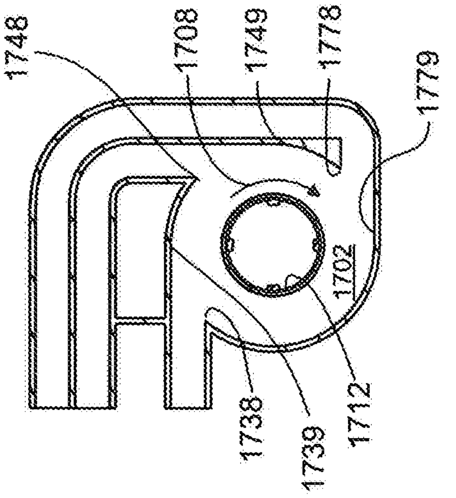
FIG. 14D is a sectional view of the example cyclone and airflow passage of FIG. 14A, taken along line 14-14 in FIG. 14B; and, FIG. 15 is a top section view of another example cyclone and airflow passage for a vacuum cleaner in accordance with an embodiment.
Figure 14B:
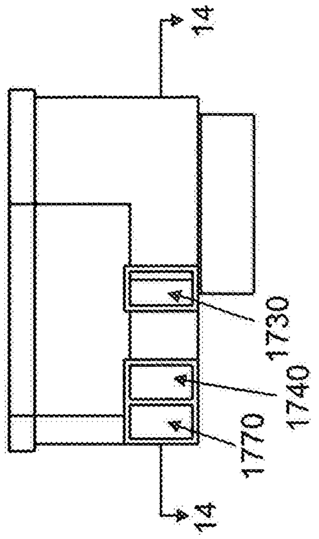
FIG. 14B is a front view of the example cyclone and airflow passage of FIG. 14A.
Figure 14C:
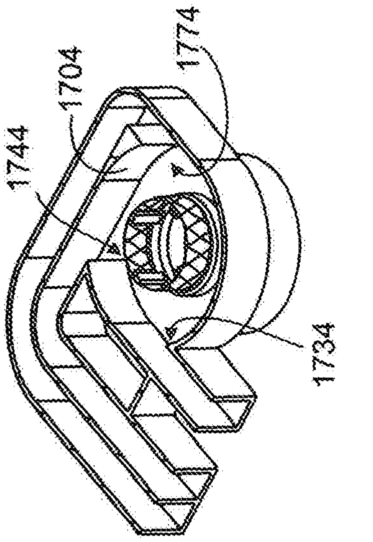
FIG. 14C is a perspective sectional view of the example cyclone and airflow passage of FIG. 14A, taken along line 14-14 in FIG. 14B.
Figure 14A:
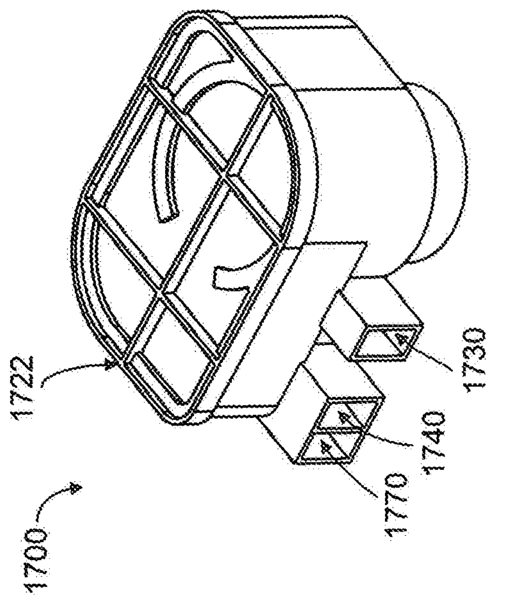
FIG. 14A is a top perspective view of an example cyclone and airflow passage for a vacuum cleaner in accordance with an embodiment.

As shown in FIG. 14C, the first tangential air inlet 1734 extends between an upstream edge 1738 and a downstream edge 1739 that is downstream from the upstream edge 1738 in the direction of rotation 1708 of the cyclone chamber 1702. The second tangential air inlet 1744 also extends between an upstream edge 1748 and a downstream edge 1749 that is downstream from the upstream edge 1748 in the direction of rotation 1708. The third tangential air inlet 1774 also extends between an upstream edge 1778 and a downstream edge 1779 that is downstream from the upstream edge 1778 in the direction of rotation 1708. Each of the tangential air inlets may be positioned at the same height within the cyclone chamber (i.e. substantially aligned along the longitudinal extent of the cyclone chamber).

Figure 15:
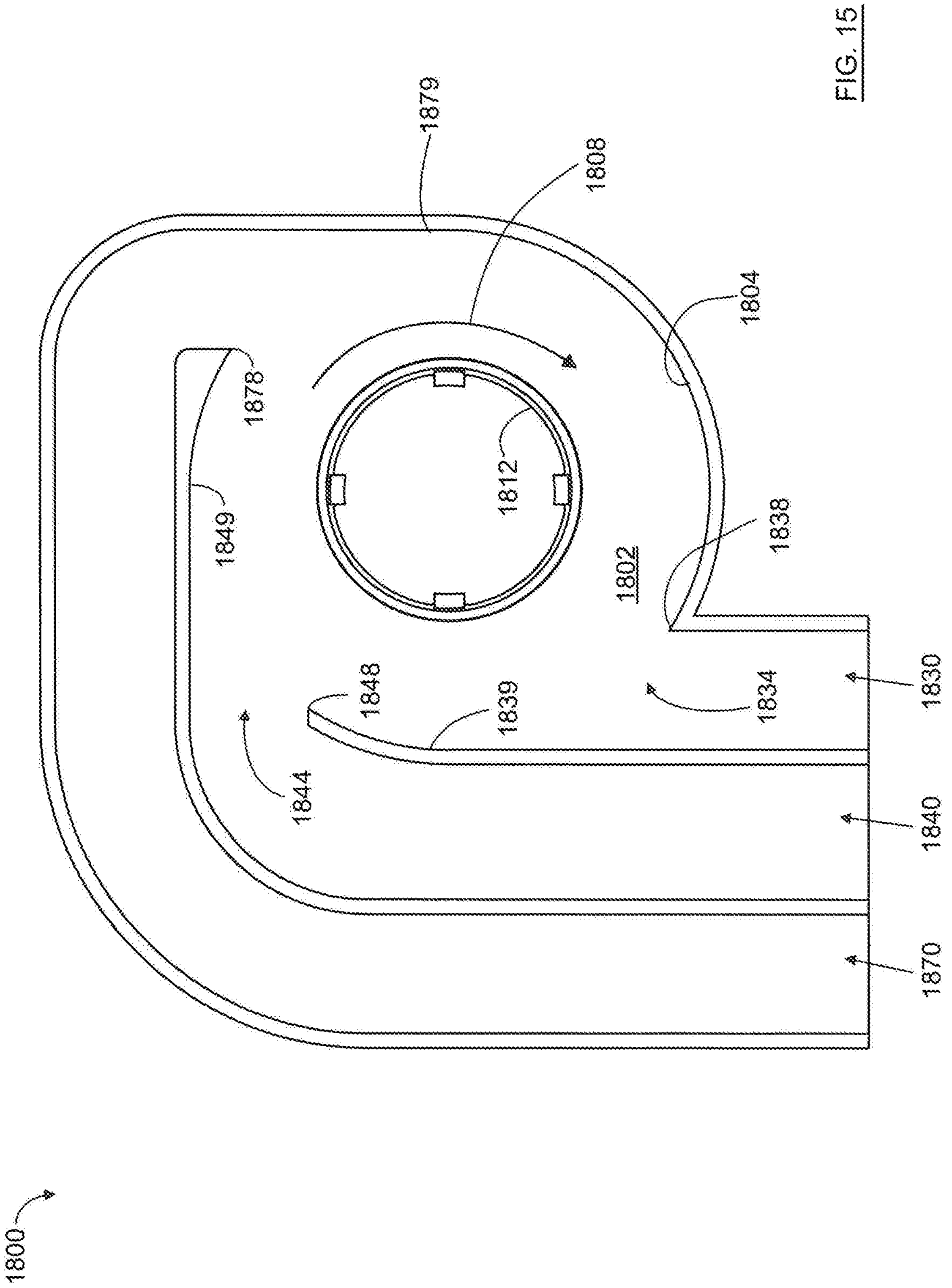

FIG. 15 illustrates an example configuration of a cyclone unit 1800 that may be used with a surface cleaning apparatus, such as surface cleaning apparatuses 1000 and 1000A. As with cyclone unit 1700, the cyclone unit 1800 includes three cyclone inlets 1834, 1844 and 1874 positioned at the downstream end of first, second and third separate airflow passages 1830, 1840, and 1870 respectively. However, in the example of FIG. 15, the first airflow passage 1830 is adjacent to the second airflow passage 1840, and the second airflow passage 1840 and third airflow passage 1870 are adjacent one another.

As shown, the width of each airflow passage 1830, 1840, and 1870 is about the same as, or slightly less than the radial width of the cyclone chamber 1802. This may allow a greater volume of air to enter the cyclone chamber 1802 with a reduce height for each inlet.

As with cyclone chamber 1202, the cyclone chamber 1802 includes a cyclone chamber sidewall 1804 that extends generally parallel to the cyclone axis. The air inlets to the cyclone chamber 1802 may include inlet ports formed in the sidewall 1804. The cyclone chamber 1800 also includes a vertically extending vortex finder conduit 1812.

In the example of FIG. 15, a first airflow passage 1830, a second airflow passage 1840, and a third airflow passage 1870 are connected to the cyclone chamber 1802. The first airflow passage 1830 extends, e.g., from a downstream end of a common inlet passage (not shown) to a downstream outlet 1834 that defines a first tangential cyclone air inlet. The second airflow passage 1840 extends, e.g., from a downstream end of a common inlet passage (not shown) to a downstream outlet 1844 that defines a second tangential cyclone air inlet. The third airflow passage 1870 also extends, e.g., from a downstream end of a common inlet passage (not shown) to a downstream outlet 1874 that defines a third tangential cyclone air inlet.

The first tangential air inlet 1834 extends between an upstream edge 1838 and a downstream edge 1839 that is downstream from the upstream edge 1838 in the direction of rotation 1808 of the cyclone chamber 1802. The second tangential air inlet 1844 also extends between an upstream edge 1848 and a downstream edge 1849 that is downstream from the upstream edge 1848 in the direction of rotation 1808. The third tangential air inlet 1874 also extends between an upstream edge 1878 and a downstream edge 1879 that is downstream from the upstream edge 1878 in the direction of rotation 1808. Each of the tangential air inlets may be positioned at the same height within the cyclone chamber, as shown.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A vacuum cleaner comprising:

(a) an air flow path extending from a dirty air inlet to a clean air outlet with a suction motor positioned in the air flow path; and, (b) a cyclone positioned in the air flow path, the cyclone having a cyclone chamber, a cyclone chamber sidewall, a first airflow passage having an inlet end and a downstream outlet end, which comprises a first tangential air inlet, wherein the first airflow passage has a non-tangential upstream portion that is upstream of the first tangential air inlet, a second airflow passage having an inlet end and a downstream outlet end, which comprises a second tangential air inlet, wherein the second airflow passage has a non-tangential upstream portion that is upstream of the second tangential air inlet, a cyclone air outlet and a longitudinal cyclone axis about which the air rotates in the cyclone chamber in a direction of rotation of air in the cyclone chamber, wherein the first tangential air inlet has an upstream edge that is upstream from a downstream edge of the first tangential air inlet in the direction of rotation of air in the cyclone chamber and the second tangential air inlet has an upstream edge that is upstream from a downstream edge of the second tangential air inlet in the direction of rotation of air in the cyclone chamber, and wherein the upstream portions of the first and second airflow passages are isolated from each other and wherein the second tangential air inlet is positioned around a perimeter of the cyclone chamber sidewall downstream from the first tangential air inlet in the direction of rotation of air in the cyclone chamber.

2. The vacuum cleaner of claim 1 wherein a plane transverse to the cyclone axis extends through the first and second tangential air inlets.

3. The vacuum cleaner of claim 1 wherein the upstream portions of each of the first and second airflow passages extends generally parallel to each other and the upstream portions are adjacent each other.

4. The vacuum cleaner of claim 1 wherein the upstream portions of each of the first and second airflow passages extends generally linearly.

5. The vacuum cleaner of claim 1 wherein the first and second airflow passages are positioned exterior to the cyclone chamber sidewall.

6. The vacuum cleaner of claim 1 wherein the inlet end of the first airflow passage and the inlet end of the second airflow passage are each in fluid communication with a single upstream air flow conduit.

7. The vacuum cleaner of claim 1 wherein the vacuum cleaner is a hand vacuum cleaner and each of the first and second airflow passages extend from the dirty air inlet.

8. The vacuum cleaner of claim 1 wherein the vacuum cleaner is a hand vacuum cleaner and each of the first and second airflow passages extend from an inlet end of the dirty air inlet.

9. The vacuum cleaner of claim 1 wherein the upstream edge of the second tangential air inlet is adjacent the downstream edge of the first tangential air inlet.

10. The vacuum cleaner of claim 1 wherein a portion of the cyclone chamber sidewall is positioned between the upstream edge of the second tangential air inlet and the downstream edge of the first tangential air inlet.

11. The vacuum cleaner of claim 10 wherein a downstream portion of the second airflow passage is spaced apart from a downstream portion of the first airflow passage.

12. A vacuum cleaner comprising:

(a) an air flow path extending from a dirty air inlet to a clean air outlet with a suction motor positioned in the air flow path; and, (b) a cyclone positioned in the air flow path, the cyclone having a cyclone chamber, a cyclone chamber sidewall, a first airflow passage having an inlet end and a downstream outlet end wherein the downstream outlet end comprises a first tangential air inlet, a second airflow passage having an inlet end and a downstream outlet end wherein the downstream outlet end comprises a second tangential air inlet, a cyclone air outlet and a longitudinal cyclone axis about which the air rotates in the cyclone chamber in a direction of rotation of air in the cyclone chamber, wherein the air flow path comprises a common airflow passage upstream of the first and second airflow passages, wherein a divider is located at a downstream end of the common airflow, and wherein the second tangential air inlet is positioned around a perimeter of the cyclone chamber sidewall downstream from the first tangential air inlet in the direction of rotation of air in the cyclone chamber, and wherein the divider is positioned between the inlet end of the first airflow passage and the inlet end of the second airflow passage.

13. The vacuum cleaner of claim 12 wherein the common airflow passage extends downstream from the dirty air inlet and the common airflow passage extends generally linearly to the first and second airflow passages.

14. The vacuum cleaner of claim 12 wherein the vacuum cleaner has an absence of an annular flow region extending around the cyclone and positioned upstream of the tangential air inlets.

15. The vacuum cleaner of claim 12 wherein the divider faces an outlet end of the common airflow passage.

16. A vacuum cleaner comprising:

(a) an air flow path extending from a dirty air inlet to a clean air outlet with a suction motor positioned in the air flow path; and, (b) a cyclone positioned in the air flow path, the cyclone having a cyclone chamber, a cyclone chamber sidewall, a first airflow passage having an inlet end and a downstream outlet end wherein the downstream outlet end comprises a first tangential air inlet, a second airflow passage having an inlet end and a downstream outlet end wherein the downstream outlet end comprises a second tangential air inlet, a cyclone air outlet and a longitudinal cyclone axis about which the air rotates in the cyclone chamber in a direction of rotation of air in the cyclone chamber, wherein the air flow path comprises a common airflow passage upstream of the first and second airflow passages, and wherein the second tangential air inlet is positioned around a perimeter of the cyclone chamber sidewall downstream from the first tangential air inlet in the direction of rotation of air in the cyclone chamber, and wherein a divider is located at a downstream end of the common airflow, and the divider is positioned to divide the air from the common airflow passage into the first airflow passage and second airflow passage.

17. The vacuum cleaner of claim 16 wherein the common airflow passage extends downstream from the dirty air inlet and the common airflow passage extends generally linearly to the first and second airflow passages.

18. The vacuum cleaner of claim 16 wherein the vacuum cleaner has an absence of an annular flow region extending around the cyclone and positioned upstream of the tangential air inlets.

19. The vacuum cleaner of claim 16 wherein the divider faces an outlet end of the common airflow passage.

20. The vacuum cleaner of claim 16 wherein the divider is positioned between the inlet end of the first airflow passage and the inlet end of the second airflow passage.

* * * * *